United States Patent
Driscoll et al.

(10) Patent No.: US 10,396,468 B2
(45) Date of Patent: Aug. 27, 2019

(54) ANTENNA HAVING INCREASED SIDE-LOBE SUPPRESSION AND IMPROVED SIDE-LOBE LEVEL

(71) Applicant: Echodyne Corp, Bellevue, WA (US)

(72) Inventors: Tom Driscoll, Bellevue, WA (US); John Desmond Hunt, Seattle, WA (US); Nathan Ingle Landy, Seattle, WA (US); Milton Perque, Seattle, WA (US); Charles A. Renneberg, Seattle, WA (US); Ioannis Tzanidis, Woodinville, WA (US); Robert Tilman Worl, Maple Valley, WA (US); Felix D. Yuen, Newcastle, WA (US)

(73) Assignee: Echodyne Corp, Bellevue, WA (US)

( * ) Notice: Subject to any disclaimer, the term of this patent is extended or adjusted under 35 U.S.C. 154(b) by 321 days.

(21) Appl. No.: 15/240,980

(22) Filed: Aug. 18, 2016

(65) Prior Publication Data
US 2018/0054004 A1    Feb. 22, 2018

(51) Int. Cl.
*H01Q 21/00* (2006.01)
*H01Q 3/26* (2006.01)
(Continued)

(52) U.S. Cl.
CPC ........ *H01Q 21/0037* (2013.01); *B60W 10/04* (2013.01); *B60W 10/20* (2013.01);
(Continued)

(58) Field of Classification Search
CPC .. B60W 10/04; B60W 10/20; B60W 2420/52; B60W 2550/10; B60W 2710/18;
(Continued)

(56) References Cited

U.S. PATENT DOCUMENTS 2,981,949 A    4/1961  Elliott
3,987,454 A  * 10/1976  Epis ................... H01Q 21/0043
                                                343/771
(Continued)

OTHER PUBLICATIONS

International Searching Authority, International Search Report and Written Opinion from PCT Application No. PCT/US2017/046943 dated Oct. 26, 2017, From PCT Counterpart of U.S. Appl. No. 15/240,980, pp. 1-20, WO.

(Continued)

*Primary Examiner* — Timothy A Brainard
(74) *Attorney, Agent, or Firm* — Fogg & Powers LLC

(57) ABSTRACT

An embodiment of an antenna includes first and second transmission lines, first antenna elements, and second antenna elements. The first transmission line is configured to guide a first signal such that the first signal has a characteristic of a first value, and the second transmission line is configured to guide a second signal such that the second signal has the same characteristic but of a second value that is different than the first value. The first antenna elements are each disposed adjacent to the first transmission line and are each configured to radiate the first signal in response to a respective first control signal, and the second antenna elements are each disposed adjacent to the second transmission line and are each configured to radiate the second signal in response to a respective second control signal. Such an antenna can have better main-beam and side-lobe characteristics, and a better SIR, than prior antennas.

58 Claims, 15 Drawing Sheets

(51) Int. Cl.
| | |
|---|---|
| *G01S 13/93* | (2006.01) |
| *G05D 1/00* | (2006.01) |
| *G05D 1/02* | (2006.01) |
| *B60W 10/04* | (2006.01) |
| *B60W 10/20* | (2006.01) |
| *B60W 30/09* | (2012.01) |
| *B64C 1/36* | (2006.01) |
| *B64C 39/02* | (2006.01) |
| *H01Q 15/00* | (2006.01) |
| *H01Q 3/44* | (2006.01) |
| *H01Q 13/28* | (2006.01) |
| *H01Q 1/32* | (2006.01) |

(52) U.S. Cl.
CPC .......... *B60W 30/09* (2013.01); *B64C 1/36* (2013.01); *B64C 39/024* (2013.01); *G01S 13/931* (2013.01); *G01S 13/9303* (2013.01); *G05D 1/0088* (2013.01); *G05D 1/0257* (2013.01); *H01Q 3/2641* (2013.01); *H01Q 3/443* (2013.01); *H01Q 13/28* (2013.01); *H01Q 15/0066* (2013.01); *H01Q 21/005* (2013.01); *H01Q 21/0012* (2013.01); *B60W 2420/52* (2013.01); *B60W 2550/10* (2013.01); *B60W 2710/18* (2013.01); *B60W 2710/20* (2013.01); *B64C 2201/00* (2013.01); *G01S 2013/9342* (2013.01); *G01S 2013/9346* (2013.01); *H01Q 1/3233* (2013.01)

(58) Field of Classification Search
CPC ..... B60W 2710/20; B60W 30/09; B64C 1/36; B64C 2201/00; B64C 39/024; G01S 13/9303; G01S 13/931; G01S 2013/9342; G01S 2013/9346; G05D 1/0088; G05D 1/0257; H01Q 21/0037; H01Q 3/2641; H01Q 13/28; H01Q 15/0066; H01Q 1/3233; H01Q 21/0012; H01Q 21/005; H01Q 3/443
USPC .......................................................... 342/71
See application file for complete search history.

(56) References Cited

U.S. PATENT DOCUMENTS

| | | | |
|---|---|---|---|
| 4,870,424 A | 9/1989 | Lalezari et al. | |
| 5,736,907 A * | 4/1998 | Chen | G01S 3/04 333/113 |
| 5,781,157 A | 7/1998 | Laird | |
| 6,751,442 B1 * | 6/2004 | Barrett | H01Q 1/3275 455/11.1 |
| 7,081,851 B1 | 7/2006 | Lewis | |
| 9,385,435 B2 | 7/2016 | Bily et al. | |
| 9,450,310 B2 | 9/2016 | Bily et al. | |
| 9,853,361 B2 | 12/2017 | Chen et al. | |
| 2005/0122255 A1 * | 6/2005 | Shmuel | H01P 5/107 342/175 |
| 2006/0114155 A1 | 6/2006 | Numminen | |
| 2006/0132374 A1 * | 6/2006 | Wang | H01Q 1/3275 343/770 |
| 2011/0063158 A1 | 3/2011 | Kondou | |
| 2012/0194399 A1 | 8/2012 | Bily et al. | |
| 2014/0266946 A1 | 9/2014 | Bily et al. | |
| 2015/0109178 A1 | 4/2015 | Hyde et al. | |
| 2015/0214615 A1 | 7/2015 | Patel et al. | |
| 2015/0288063 A1 | 10/2015 | Johnson et al. | |
| 2015/0318618 A1 | 11/2015 | Chen et al. | |
| 2016/0011307 A1 | 1/2016 | Casse et al. | |
| 2016/0099500 A1 | 4/2016 | Kundtz et al. | |
| 2018/0026365 A1 | 1/2018 | Driscoll et al. | |

OTHER PUBLICATIONS

Huang et al, "Chapter 11, Design and Modeling of Micorstrip Line to Substrate Integrated Waveguide Transitions", "Passive Micowave Components and Antennas", "retrieved on Feb. 5, 2017 from: http://www.intechopen.com/books/passive-microwavecomponents-and-antennas/design-and-modeling-of-microstrip-line-to-substrate-integrated-waveguidetransitions", dated Apr. 1, 2010, pp. 225-246 and reference, Publisher: INTECH.

International Searching Authority, "International Search Report and Written Opinion from PCT Application No. PCT/US2017/043110 dated Nov. 2, 2017", from Foreign Counterpart of U.S. Appl. No. 15/655,505, filed Nov. 2, 2017, pp. 1-15, Published: EP.

U.S. Patent and Trademark Office, "Office Action", U.S. Appl. No. 15/655,505, May 30, 2019, pp. 1-27, Published: US.

* cited by examiner

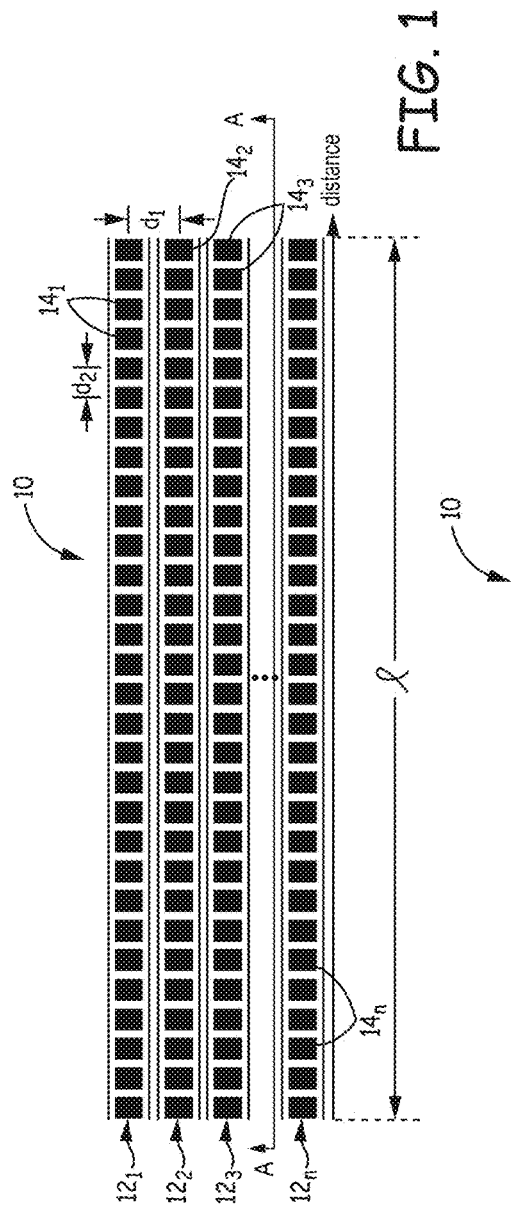
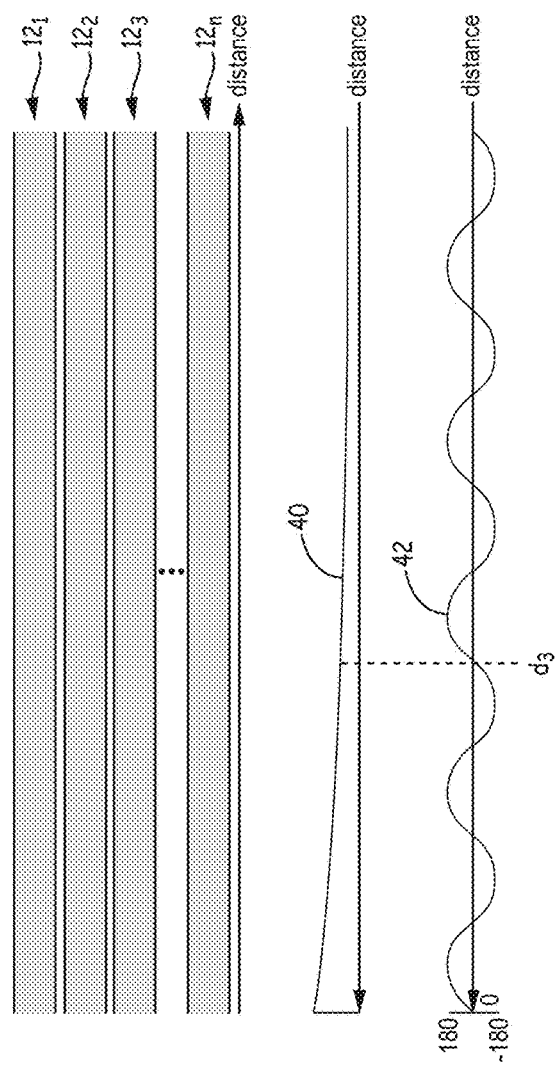

ANTENNA HAVING INCREASED SIDE-LOBE SUPPRESSION AND IMPROVED SIDE-LOBE LEVEL

BACKGROUND

Beam-steering antennas are used in a wide variety of applications. For example, a phased-array antenna can steer one or more radar beams to a desired angle in two dimensions (e.g., azimuthal angle and elevation angle), and can re-steer those one or more beams electronically in microseconds. This electronic beam-steering capability is useful for many applications in radar such as navigation, surveillance, and imaging.

More recently, researchers have developed holographic-aperture beam-steering antennas, which can consume significantly less power than phased-array antennas, and can also be significantly smaller (e.g., significantly thinner and significantly lighter). For example, the dimensions of a square holographic beam-steering antenna can be on the order of $10\lambda_o \times 10\lambda_o \times 0.1\lambda_o$, where $\lambda_o$ is the wavelength at which the holographic antenna is designed to operate; therefore, a holographic beam-steering antenna designed to operate at 20 GHz can have dimensions on the order of 15 centimeters (cm)×15 cm×1.5 cm (approximately 7 inches (in)×7 in ×0.7 in).

Ideally, researchers would like to design a holographic-aperture beam-steering antenna that would concentrate all of the signal energy in the main beam(s) at every possible steer angle such that no side beams (hereinafter "side lobes") would exist (i.e., all side lobes would have zero energy).

But because designing such an ideal antenna, at least with today's technology, is not possible due to, e.g., practical limitations on manufacturing tolerances, and on how small the antenna elements and the inter-element spacing can be, today's holographic beam-steering antennas have multiple side lobes of non-zero energy.

Unfortunately, the smaller the difference(s) between the gain(s) of the main beam(s) and the gain(s) of the major side lobe(s), the lower the signal-to-interference ratio (SIR) of the antenna. Hereinafter, this difference (or these differences if more than one) is referred to as the side-lobe level, and can be an absolute difference, e.g., between the main beam (the smallest main beam in an application with multiple main beams) and the largest side lobe, can be an average difference between the main beam (the smallest main beam in an application with multiple main beams) and each of the side lobes, or can be an average difference between the main beam (the smallest main beam in an application with multiple main beams) and each of the major side lobes. The side-lobe level is said to be improved when its magnitude is increased. That is, if the side-lobe level is calculated, in general, as main beam minus side lobe, then the side-lobe level improves as the side-lobe level increases. Conversely, if the side-lobe level is calculated, in general, as side lobe minus main beam, then the side-lobe level improves as the side-lobe level decreases.

Power in the side lobes is additionally undesirable, as it parasitically increases the total power which the antenna must transmit/receive for a given main-beam characteristic (e.g., gain).

Consequently, researchers are searching for ways to increase the magnitude of the side-lobe level (i.e., to decrease the side-lobe gain) generated by a holographic-aperture beam-steering antenna so as to increase the SIR of the antenna system, and to decrease the overall transmit/receive power required by the antenna.

SUMMARY

In an embodiment, an antenna includes first and second transmission lines, first antenna elements, and second antenna elements. The first transmission line is configured to guide a first signal such that the first signal has a characteristic (e.g., amplitude, phase, direction of propagation, or momentum $\vec{k}$) of a first value, and the second transmission line is configured to guide a second signal such that the signal has the same characteristic but of a second value that is different than the first value. The first antenna elements are each disposed adjacent to the first transmission line and are each configured to radiate the first signal in response to a respective first control signal, and the second antenna elements are each disposed adjacent to the second transmission line and are each configured to radiate the second signal in response to a respective second control signal.

Such an antenna can be a holographic-aperture antenna that generates and steers one or more main beams while suppressing the side lobes (e.g., increasing the magnitude of the side-lobe level between the main beam(s) and the major side lobes) more than prior antennas can suppress the side lobes. For example, the antenna can provide superior side-lobe suppression by causing the first signal to have a different momentum $\vec{k}$ (i.e., a different amplitude, a different propagation direction, or both a different amplitude and a different propagation direction) than the second signal. And a designer can increase the number of waveguides, signals, or antenna elements of the antenna to suppress the side lobes to an even greater degree.

In another embodiment, an antenna assembly includes an antenna and a feeder. The antenna includes a first antenna section having a first transmission line configured to guide a first signal, and having first antenna elements each disposed adjacent to the first transmission line and each configured to radiate the first signal in response to a respective first control signal. And the antenna also includes a second antenna section having a second transmission line configured to guide a second signal, and having second antenna elements each disposed adjacent to the second transmission line and each configured to radiate the second signal in response to a respective second control signal. The feeder is configured to feed the first signal to the first transmission line such that the first signal has a characteristic (e.g., amplitude, phase, direction of propagation, or momentum $\vec{k}$) of a first value, and to feed the second signal to the second transmission line such that the second signal has the characteristic of a second value that is different than the first value.

Like the above-described antenna, such an antenna assembly can generate and steer one or more main beams while suppressing the side lobes more than prior antennas can suppress the side lobes. For example, the feeder can provide superior side-lobe suppression by causing the first signal to have a different magnitude, a different phase, or both a different magnitude and a different phase than the second signal. Furthermore, the antenna, which can be a holographic-aperture antenna, can provide superior side-lobe suppression by causing the first signal to have a different momentum $\vec{k}$ (i.e., a different magnitude, a different propagation direction, or both a different magnitude and different propagation direction) than the second signal. And a designer can increase the number of transmission lines, signals, and antenna elements of the antenna to suppress the side lobes to an even greater degree.

BRIEF DESCRIPTION OF THE DRAWINGS

FIG. 1 is a plan view of a holographic-aperture antenna having multiple parallel, rectangular-strip waveguides, and having corresponding one-dimensional arrays of antenna elements.

FIG. 4 is a plan view of the antenna of FIG. 1, and plots of the amplitude and phase of the signals propagating along the respective waveguides as functions of position.

DETAILED DESCRIPTION

The words "approximately" and "substantially" may be used below to indicate that two or more quantities can be exactly equal, or can be within ±10% of each other due to manufacturing tolerances, or other design considerations, of the physical structures described below. Furthermore, the term "transmission line" denotes any physical structure along which an electromagnetic wave can propagate. Examples of "transmission lines" include waveguides and optical fibers.

FIG. 1 is a plan view of a holographic-aperture antenna 10 having multiple waveguides $12_1$-$12_n$ and corresponding conductive antenna elements $14_1$-$14_n$. The waveguides 12 are conventional rectangular-strip transmission-line waveguides, only the top portions of which are visible in FIG. 1, and are approximately parallel to one another. The antenna elements $14_1$-$14_n$ are arranged over the waveguides 12 in respective one-dimensional arrays. For example, the antenna elements $14_1$ are arranged in a one-dimensional array over the waveguide $12_1$, the antenna elements $14_2$ are arranged in a one-dimensional array over the waveguide $12_2$, and so on. Assuming that the antenna 10 is designed to transmit and receive signals at a wavelength of $\lambda_0$, the waveguides 12 are spaced apart from one another, on longitudinal center, by a distance $d_1 \approx \lambda_0/2$, and the antenna elements 14 within each one-dimensional array are spaced apart from one another by a distance $d_2 \ll \lambda_0$. For example, $\lambda_0/1000 < d_2 < \lambda_0/10$. Furthermore, each of the waveguides 12 has approximately the same length l of between approximately $3\lambda_0$-$20\lambda_0$, or the length l can be even longer than $20\lambda_0$.

Figure 2:
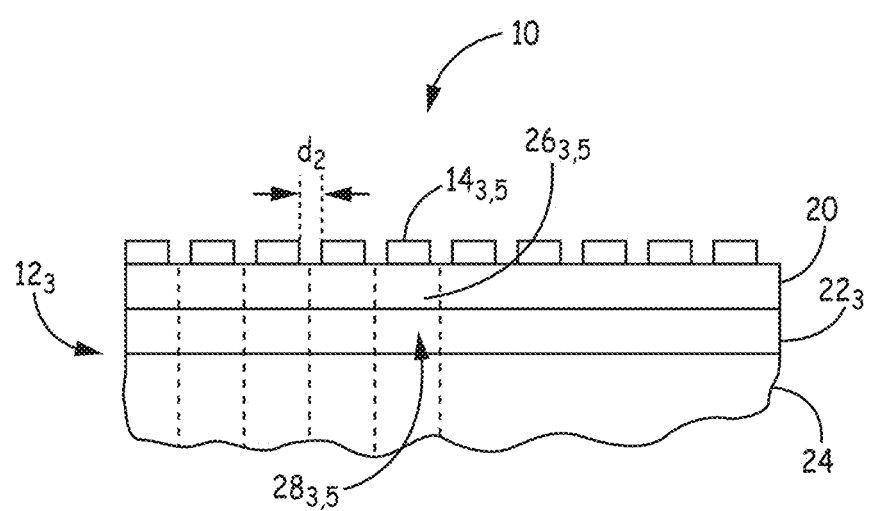
FIG. 2 is a side view of the antenna of FIG. 1

FIG. 2 is a cut-away side view of the antenna 10 of FIG. 1, taken along line A-A of FIG. 1. Although only the waveguide $12_3$ and the corresponding antenna elements $14_3$ are shown in FIG. 2, the following discussion also applies to the other waveguides and antenna elements.

The waveguide $12_3$ includes a coupling layer 20 having an adjustable impedance about a frequency $f_0=c/\lambda_0$, a conductive layer/strip $22_3$, and a dielectric layer 24, where c is the speed of light in free space. Although not shown, the antenna 10 includes a conductive plane, such as a ground plane, disposed beneath the dielectric layer 24. In operation, a signal guided by the waveguide $12_3$ propagates along the dielectric layer 24 between the conductive strip $22_3$ and the ground plane. Although the antenna 10 can include a single coupling layer 20 and a single dielectric layer 24 common to all of the waveguides 12, the antenna includes separate conductive strips 22, one strip per waveguide. It is these strips 22, and the corresponding antenna elements 14, that are spaced apart by the distance $d_1$ (see FIG. 1).

Each antenna element $14_3$, and a coupling region $26_3$ of the layer 20 disposed below the antenna element, form a respective antenna unit $28_3$. For example, the antenna element $14_{3,5}$ and the coupling region $26_{3,5}$ of the layer 20 form an antenna unit $28_{3,5}$ of the antenna 10.

Figure 3:
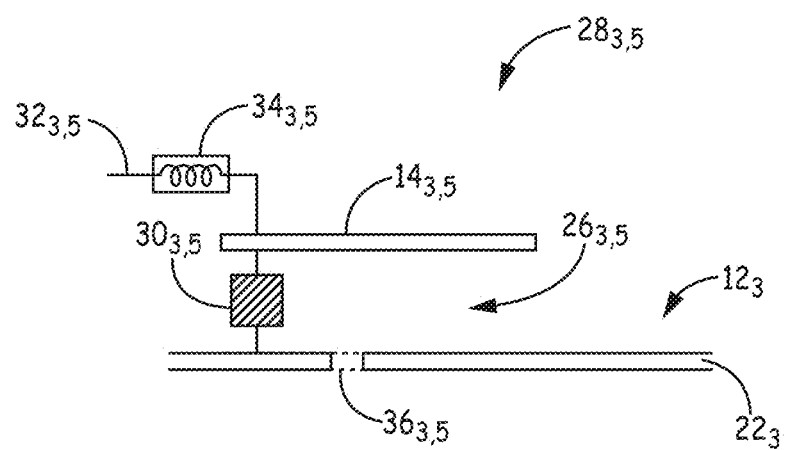
FIG. 3 is a side view and an electrical diagram of the antenna of FIGS. 1 and 2.

FIG. 3 is a side view and electrical diagram of the antenna unit $28_{3,5}$ of FIG. 2, and the portion of the conductive strip $22_3$ of the waveguide $12_3$ corresponding to the antenna unit.

The coupling region $26_{3,5}$ can be modeled as a lumped adjustable-impedance element $30_{3,5}$, which is electrically coupled between the conductive strip $22_3$ and the antenna element $14_{3,5}$. A conductive control line $32_{3,5}$ is directly coupled to the lumped element $30_{3,5}$, or is indirectly coupled to the lumped element via the conductive antenna element $14_{3,5}$ as shown. As described below, a controller (not shown in FIGS. 1-3) can selectively couple and uncouple the signal propagating along the waveguide $12_3$ to and from the antenna element $14_{3,5}$, and can thus selectively activate and deactivate the antenna element, by selectively changing the bias signal (e.g., a bias voltage) on the control line $32_{3,5}$. Furthermore, a low-pass filter $34_{3,5}$ can be serially coupled between the lumped element $30_{3,5}$ and the controller to uncouple, from the controller, high-frequency energy from the signal propagating along the waveguide $12_3$.

And the portion of the conductive strip $22_3$ corresponding to the antenna unit $28_{3,5}$ includes a gap $36_{3,5}$, which can be filled with that same material that forms the coupling layer 20, and which is configured to couple the signal propagating along the waveguide $12_3$ to the antenna unit.

Still referring to FIG. 3, during operation of the antenna unit $28_{3,5}$, in response to the control signal on the control line $32_{3,5}$ having a level that inactivates the lumped element $30_{3,5}$, the coupling region $26_{3,5}$ presents a large impedance to the gap $36_{3,5}$, and thus blocks the signal propagating along the waveguide $12_3$ from coupling to, and exciting, the antenna element $14_{3,5}$. Therefore, the antenna element $14_{3,5}$ radiates little or no energy.

In contrast, in response to the control signal on the control line $32_{3,5}$ having a level that activates the lumped element $30_{3,5}$, the coupling region $26_{3,5}$ presents a small impedance to the gap $36_{3,5}$, and thus couples the signal propagating along the waveguide $12_3$ to the antenna element $14_{3,5}$ such that the signal excites the antenna element. Therefore, the excited antenna element $14_{3,5}$ radiates energy at the same frequency or frequencies as the frequency or frequencies of the signal propagating along the waveguide $12_3$. For example, when the lumped element $30_{3,5}$ is active, the coupling region $26_{3,5}$ is configured to form, together with the antenna element $14_{3,5}$, a series-resonant circuit having a resonant frequency of approximately $f_0$. As known, at its resonant frequency, a series-resonant circuit has a low impedance, ideally zero impedance. Because the signal propagating along the waveguide $12_3$ has a frequency of approximately $f_0$, the region $26_{3,5}$, when the lumped element $30_{3,5}$ is active, presents a low impedance to the signal. To implement such a selectively resonant circuit, the lumped element $30_{3,5}$ can be, or can include, a semiconductor device, such as a field-effect transistor (FET) or other device that, when activated, alters the impedance of the coupling region $26_{3,5}$ such that the coupling region forms, at $f_0$, a series-resonant circuit with the antenna element $14_{3,5}$, or between the conductive strip $22_3$ and the antenna element.

Still referring to FIG. 3, although only the antenna unit $28_{3,5}$ is described, all of the other antenna units 28 of the antenna 10 can have the same structure, and operate in the same manner, as the antenna unit $28_{3,5}$.

Further details of the antenna 10 and the antenna units 28 can be found in U.S. patent application Ser. No. 14/506,432, titled Surface Scattering Antennas With Lumped Elements, which was filed on 3 Oct. 2014 and which is incorporated by reference herein.

FIG. 4 is a plan view of the antenna 10 of FIGS. 1-3 and plots of the normalized amplitude 40 and the relative phase 42 of the signals propagating along the respective waveguides $12_1$-$12_n$, as functions of position along the waveguides. For clarity, the antenna elements 14 are omitted from FIG. 4. Furthermore, "relative phase" means that although the plotted phase may not be the actual phase of a signal propagating along a waveguide 12, it indicates the phase of the signal relative to the phase of another signal propagating along another waveguide.

Figure 5:
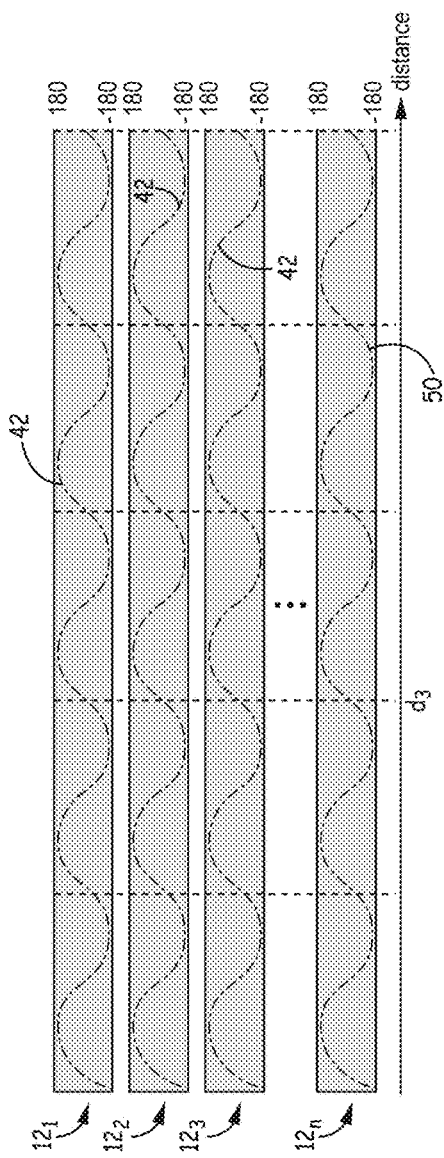
FIG. 5 is a plan view of the antenna of FIGS. 1-4, and overlays of the relative phases of the signals propagating along the respective waveguides as functions of position.

FIG. 5 is a plan view of the antenna 10 of FIGS. 1-3, and the relative phase 42 (FIG. 4), as a function of position, of the signals propagating along the respective waveguides $12_1$-$12_n$ overlaid on the respective waveguides.

Referring to FIGS. 1-5, an example of the operation of the antenna 10 is described. In this example, it is assumed that the waveguides $12_1$-$12_n$ have the same lengths l, the left ends of the waveguides are aligned with one another, and the right ends of the waveguides are aligned with one another. It is also assumed that the waveguides $12_1$-$12_n$ have the same impedances, and, therefore, affect the signals propagating along them in the same way.

A feeder (not shown in FIGS. 1-5), such as an active feeder circuit or passive feeder network, feeds respective signals into the left ends of the waveguides $12_1$-$12_n$.

It is assumed that each of the signals has substantially the same frequency equal to $f_0=c/\lambda_0$.

It is also assumed that each of the signals has, at the left end of waveguide 12 to which it is fed, the same phase, the same amplitude, and the same power, as each of the other signals.

Therefore, at any arbitrary distance $d_3$ (FIGS. 4-5) from the left ends (or from the right ends) of the waveguides 12, the signal propagating along one waveguide has the same amplitude and phase as all of the other signals that are respectively propagating along the other waveguides. That is, referring to FIGS. 4-5, the signals each have the same amplitude 40, the same relative phase 42, and the same actual phase as functions of position along the waveguides 12. In this example, the amplitude exponentially decreases as a function of distance from the left ends of the waveguides 12. Ideally, the waveguides 12 are long enough so that the amplitude decreases to zero at a location at, or before, the right ends of the waveguides. But if the waveguides are shorter than this zero-gain distance, then the right ends of the waveguides may be conventionally terminated to reduce or eliminate reflections of the signals.

To cause the antenna 10 to generate one or more main beams in two dimensions and steer those beam(s) in time, a controller (not shown in FIGS. 1-5) generates respective control signals on the control lines 32 (FIG. 3) to activate and deactivate the antenna elements 14 as a function of location and time. Each active antenna element 14 is excited by the signal propagating along the waveguide 12 over which the antenna element is located, and, therefore, radiates a respective signal having the frequency $f_0$. For example, as described above in conjunction with FIG. 3, in response to the control signal on the line $32_{3,5}$ activating the coupling region $26_{3,5}$, the signal propagating along the waveguide $12_3$ excites the antenna element $14_{3,5}$, thus causing the antenna element to radiate a respective signal having the same frequency $f_0$ as the signal propagating along the waveguide $12_3$. The signals radiated by the active antenna elements 14 interfere with each other in a predictable manner to generate one or more main beams. By spatially and temporally modulating (i.e., activating and deactivating) the states of the antenna elements according to an appropriate pattern, the controller can cause the antenna 10 to generate and steer one or more main beams. For example, where $f_0$ is in the range of frequencies used for radar, the controller can cause the antenna 10 to generate and to steer one or more radar beams.

Still referring to FIGS. 1-5, for any give orientation of the one or more main beams, the side-lobe level between the smallest main beam and the largest side lobe (or between the average gain of the main beams and the average gain of the side lobes, or between the gain of the largest main beam and the largest side lobe), and thus the SIR of the antenna 10, depends on the spatial modulation of the antenna elements 14. Or put another way, the side-lobe level, or more generally, the side-lobe characteristics at any given orientation of the one or more main beams, depends on the spatial pattern of the active and inactive antenna elements 14 that yields the main-beam orientation.

Therefore, for each orientation of the one or more main beams, one can experiment with different spatial modulation patterns of the antenna elements 14 to determine which pattern gives the best side-lobe characteristics such as the highest-magnitude side-lobe level between the smallest main beam and the largest side lobe.

A problem with changing the spatial modulation pattern is that because the spatial modulation pattern represents a single independent variable, or a single "degree of freedom," changing the spatial modulation pattern also can change the characteristics (e.g., gain, phase, half-power (−3 dB) beam width) of the one or more main beams in an undesirable manner. For example, the spatial-modulation pattern that yields the highest-magnitude side-lobe level between the smallest main beam and the largest side lobe may yield a subpar characteristic (e.g., width) of at least one of the one or more main beams; likewise, the spatial-modulation pattern that yields the best main-beam characteristics may yield a subpar side-lobe level. Therefore, a system designer may be forced to choose a spatial-modulation pattern that yields a subpar main-beam characteristic to achieve a desired side-lobe characteristic (e.g., side-lobe level), or a spatial-modulation pattern that yields a subpar side-lobe characteristic to achieve a desired main-beam characteristic. Or a system designer may be forced to choose a spatial-modulation pattern that yields both a subpar main-beam characteristic and a subpar side-lobe characteristic.

Described below are antenna structures and techniques that can solve the above-described problem by increasing the number of independent variables, or "degrees of freedom," on which the characteristics of the one or more main beams, and the characteristics of the side lobes, depend. By increasing the number of independent variables, a designer can achieve better side-lobe characteristics for given main-beam characteristics, and vice-versa, by modulating two or more of these variables with respect to the orientation of the one or more main beams. The additional independent variables that the below-described antenna structures and techniques yield include, but are not limited to, a difference in the relative phases of the signals propagating along the transmission lines (phase difference), a difference in the amplitudes of the signals (amplitude difference), a difference in the propagation direction of the signals (direction-of-propagation difference), and a difference in the momentum $\vec{K}=\vec{S}/c$ (momentum difference), where $\vec{S}$ is the Poynting vector and c is the free-space speed of light in meters/second (m/s). Because $\vec{K}$ is related to signal amplitude and propagation direction, the variable $\vec{K}$ can encompass the direction-of-propagation-difference and amplitude-difference variables.

Figure 6:
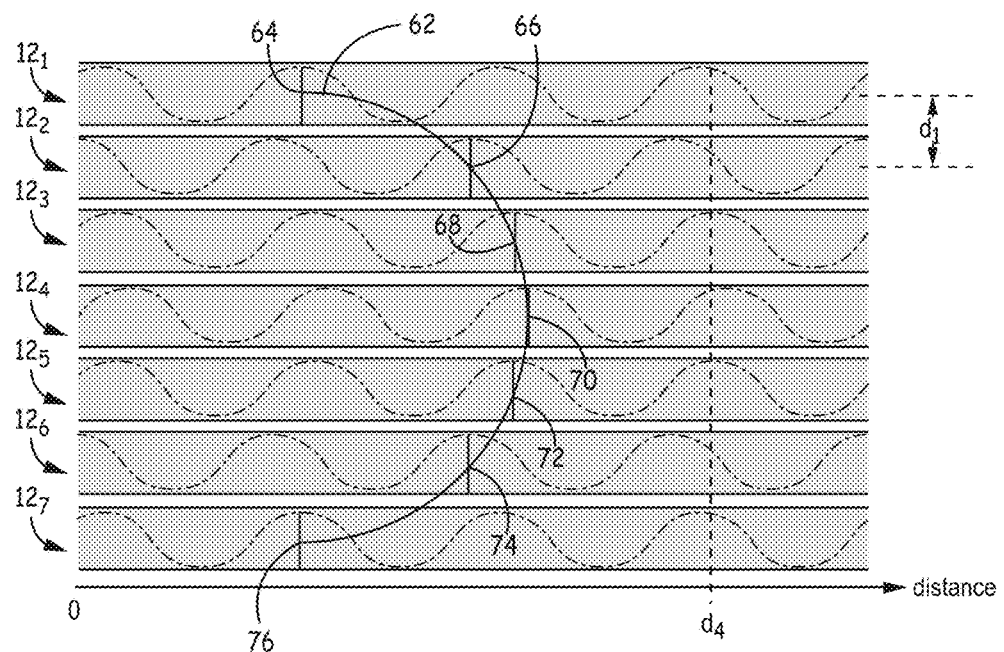
FIG. 6 is a plan view of a holographic-aperture antenna having multiple parallel, transmission lines, here rectangular-strip waveguides, and having corresponding one-dimensional arrays of antenna elements, and of overlays of the relative phases of the signals propagating along the respective waveguides as functions of position, according to an embodiment.

FIG. 6 is a plan view of a holographic-aperture antenna 60, which can be structured similarly to the antenna 10 of FIG. 1, but which is fed in a manner that provides at least two variables, antenna-element-activation pattern and phase difference, for adjusting the characteristics of the one or more main beams, and the characteristics of the side lobes such as the side-lobe level between the smallest main beam and the largest side lobe. In FIG. 6, like numbers reference components common to the antenna 60 and the antenna 10 of FIGS. 1-5. Furthermore, for clarity, the antenna elements 14 of the antenna 60 are omitted from FIG. 6, although the antenna elements of the antenna 60 can be arranged similarly to the antenna elements 14 of the antenna 10 of FIGS. 1-3. Moreover, the antenna 60 includes seven waveguides $12_1$-$12_7$.

Differently from the antenna 10 of FIGS. 4 and 5, the waveguides $12_1$-$12_7$ of the antenna 60 are fed with respective signals having different, not the same, phases. That is, at an arbitrary distance $d_4$ from the aligned left ends (or aligned right ends) of the waveguides 12, the phase of a signal propagating along one of the waveguides is different from the phase of a signal propagating along at least another one of the waveguides. To achieve this result in the embodiment illustrated in FIG. 6, the signals that propagate along the waveguides $12_1$-$12_7$ together present a semi-circular wave front 62, which means that each signal has the same phase at the point where the wave front intersects the longitudinal center of the respective waveguide. For example, at the distance $d_4$, the signal propagating along the wave guide $12_7$ has a different phase from any of the signals propagating along the waveguides $12_2$-$12_6$, and has the same phase as the signal propagating along the waveguide $12_1$. But at points 64, 66, 68, 70, 72, 74, and 76 along the wave front 62, the signals that propagate along the waveguides $12_1$-$12_7$ each have the same phase (e.g., peak amplitude at)sin(90° as shown in FIG. 6).

Figure 7:
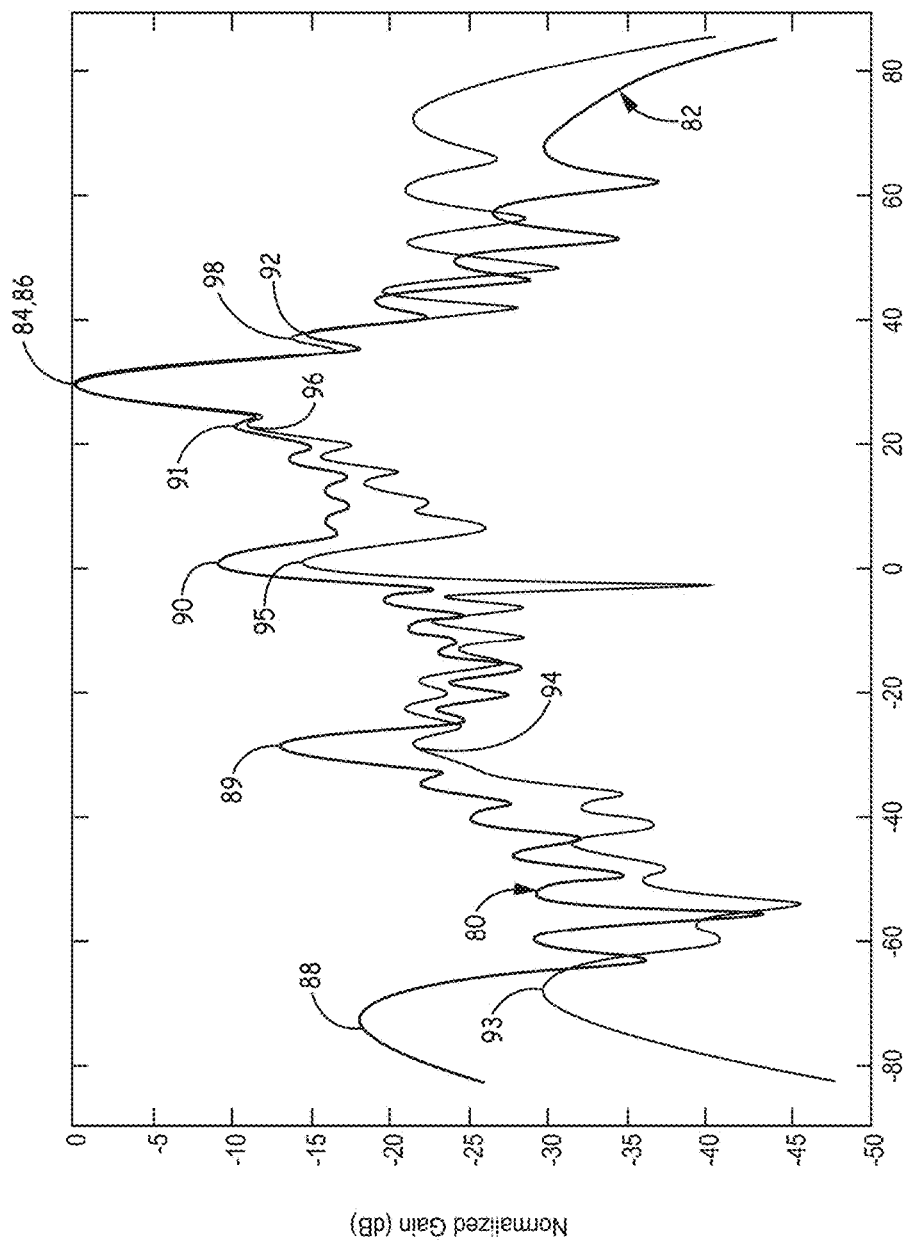
FIG. 7 is a plot comparing the normalized gains of the main beam and side lobes generated by the antenna of FIGS. 1-5 with the normalized gains of the main beam and side lobes generated by the antenna of FIG. 6 for a given main-beam steer angle, according to an embodiment.

FIG. 7 is a plot of a normalized gain pattern 80 generated by a version of the antenna 10 of FIGS. 1 and 4-5, and of a normalized gain pattern 82 generated by the antenna 60 of FIG. 6, according to an embodiment. The gain patterns 80 and 82 are in respective planes that include respective main beams 84 and 86 each at a steer angle of 30°. In more detail, although these main-beam planes are with respect to the antennas 10 and 60, respectively, each plane is in the same position relative to its antenna.

Figure 8:
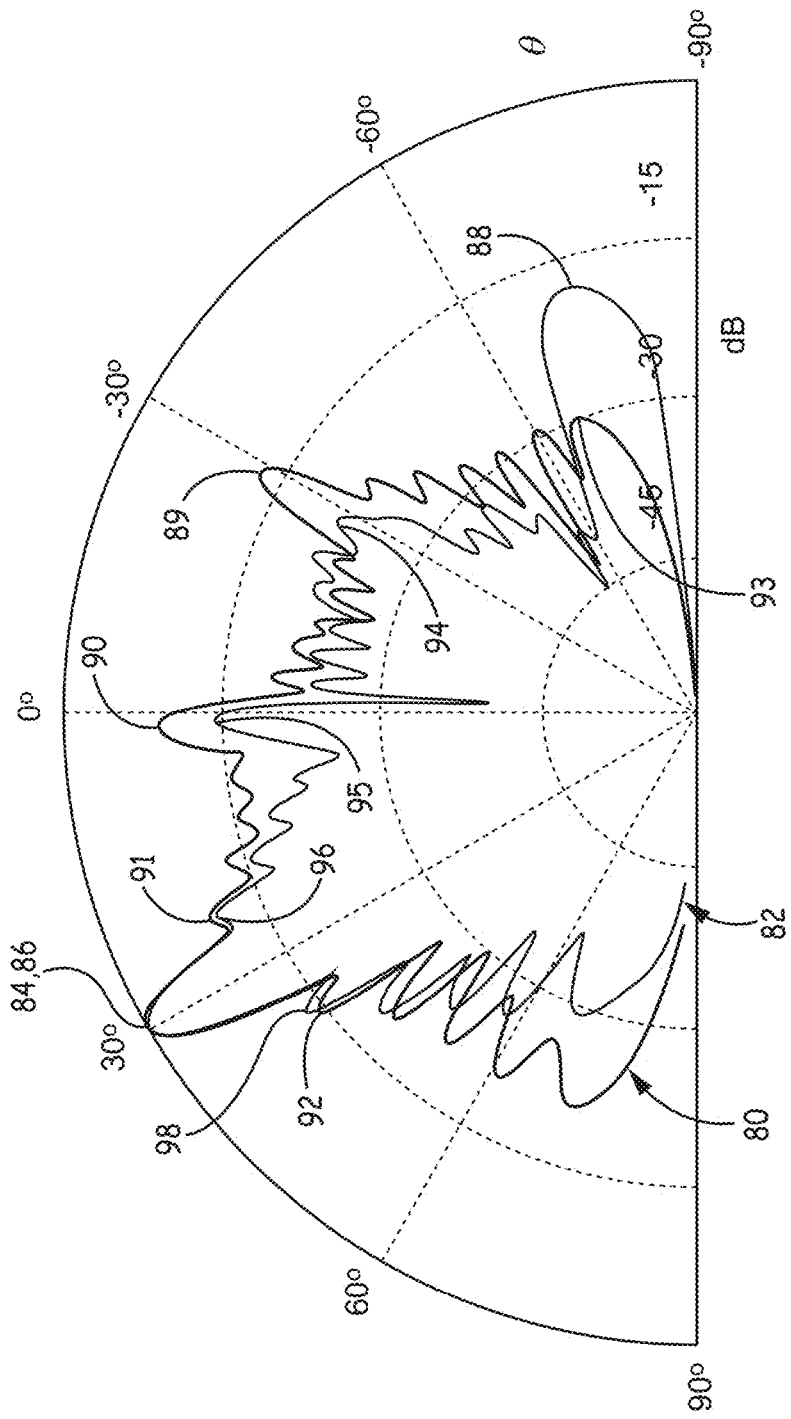
FIG. 8 is a polar plot comparing the normalized gains of the main beam and side lobes generated by the antenna of FIGS. 1-5 with the normalized gains of the main beam and side lobes generated by the antenna of FIG. 6 for a given main-beam steer angle, according to an embodiment.

And FIG. 8 is a polar plot of the normalized gain patterns 80 and 82 of FIG. 7, according to an embodiment.

Referring to FIGS. 1 and 4-8, the version of the antenna 10 that generates the gain pattern 80 has seven waveguides ($12_n = 12_7$ in FIGS. 4-5), and otherwise has the same structure as the antenna 60.

The only difference between the antennas 10 and 60 in this example is that the waveguides $12_1$-$12_7$ of the antenna 10 are fed signals each having the same phase, and the waveguides $12_1$-$12_7$ of the antenna 60 are fed signals having respective phases that collectively form a circular wave front.

Referring to FIGS. 7-8, antennas 10 and 60 respectively generate main beams 84 and 86 having approximately the same characteristics. For example, the beams 84 and 86 have approximately the same gains (normalized to 1, or 0 dB) and the same widths (at least in the planes to which the plots of FIGS. 7 and 8 correspond).

Furthermore, the gains of the major side lobes 88, 89, 90, 91, and 92 generated by the antenna 10 are, respectively, approximately 18 dB, 13 dB, 9 dB, 10 dB, and 15 dB down from the gain of the main beam 84.

But the gains of the major side lobes 93, 94, 95, 96, and 98 generated by the antenna 60, which side lobes correspond to the side lobes 88, 89, 90, 91, and 92 generated by the antenna 10, are, respectively, down approximately 30 dB, 22 dB, 14 dB, 11 dB, and 13 dB from the gain of the main beam 86.

And even though the antenna 60 generates the side lobe 98 13 db down from the gain of the main beam 86, whereas the corresponding side lobe 92 generated by the antenna 10 is 15 dB down from the gain of the main beam 84, the antenna 60 still provides a minimum-magnitude side-lobe level of approximately −11 dB between the main beam 86 and the largest side lobe 96, as compared to the antenna 10, which provides a minimum-magnitude side-lobe level of approximately −9 dB between the main beam 84 and the largest side lobe 90.

Although the difference between the minimum-magnitude side-lobe levels respectively provided by the antenna 60 and the antenna 10 is only approximately 2 dB, the magnitude of the average side-lobe level (i.e., the magnitude of the following difference: gain of the main beam minus the average gain of all of the side lobes) provided by the antenna 60 is significantly greater than the magnitude of the average side-lobe level provided by the antenna 10; therefore, the total side-lobe power provided by the antenna 60 is significantly smaller than the total side-lobe power provided by the antenna 10. This results from the majority of the side lobes generated by the antenna 60 being significantly smaller than the corresponding side lobes generated by the antenna 10.

Furthermore, because the major side lobe 96 generated by the antenna 60 is positioned relatively close to the main beam 86, the side lobe 96 is, in at least some applications, less troublesome than the major side lobes 88, 89, and 90, which the antenna 10 generates far from the main beam 84.

Consequently, providing an additional independent design variable (e.g., phase differences between the waveguide signals) to the spatial modulation of the antenna elements 14 allows a designer to improve an antenna's side-lobe characteristics (e.g., increase side-lobe gain differentiation and reduce side-lobe power), and to increase an antenna's SIR, without significantly degrading the characteristics (e.g., width) of the one or more main beams. Put another way, providing an additional design variable can provide a degree of improvement in the antenna's side-lobe characteristics and SIR, where this degree of improvement is significantly greater than a degree of degradation in the characteristics of the one or more main beams.

Referring to FIGS. 6-8, alternate embodiments of the antenna 60, and of feeding the antenna 60, are contemplated. For example, the antenna 60 may be fed with signals of different phases such that the signals form a wave front other than a semi-circular wave front; examples of such other wave fronts include circular, elliptical, triangular, and sinusoidal. Or the antenna 60 may be fed with signals of randomly changing phases such that the signals form no coherent wave front. Furthermore, to provide an additional independent variable, the antenna 60 may be fed with signals having different amplitudes instead of, or in addition to, having different phases. For example, one of the signals can have an amplitude that is different from the amplitude of at least one of the other signals, or the signals can have randomly changing amplitudes. Moreover, the antenna 60 can have more or fewer than seven waveguides 12. In addition, the waveguides 12 can be separated by a distance $d_1$ other than $\Delta_0/2$, and the antenna elements 14 within each one-dimensional array can be spaced apart from one another by a distance $d_2 \ll \lambda_0$ other than $\lambda_0/1000 < d_2 < \lambda_0/10$ (see $d_2$ in FIG. 1). Furthermore, each of the waveguides 12 can have a length 1 of that is other than between approximately $3\Delta_0$-$20\lambda_0$, and at least one waveguide can have a length that is different from the length of one or more other waveguides. Moreover, the antenna elements 14 can be arranged in other than one-dimensional arrays over the waveguides 12. In addition, although described as being flat and coplanar, the waveguides 12 can be curved and can be other than coplanar. For example, the waveguides 12 can be shaped to form part or all of a curved surface such as the surface of a cylinder, sphere, or cone. Furthermore, one or more of the waveguides 12 can be any other type of transmission line.

Figure 9:
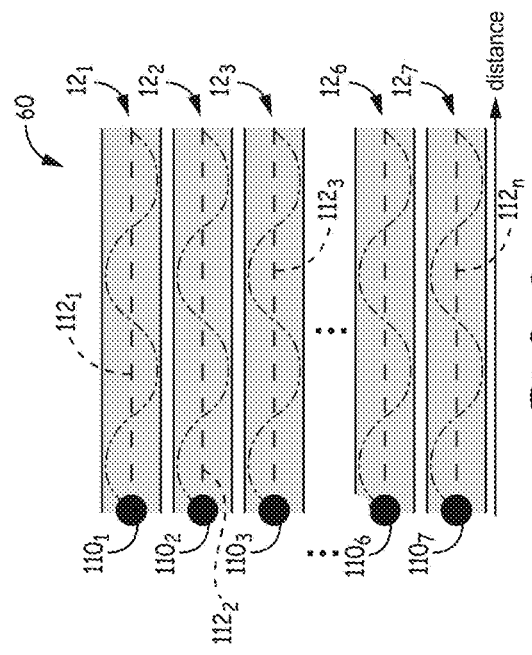
FIG. 9 is a plan view of the antenna of FIG. 6, and overlays of the relative phases of the signals propagating along the respective waveguides as functions of position, where each waveguide has an independent end feed point, according to an embodiment.

FIG. 9 is a plan view of the antenna 60 of FIG. 6, overlays of the relative phases of the signals propagating along the respective waveguides $12_1$-$12_7$, and signal feed points $110_1$-$110_7$, according to an embodiment. Each of the feed points 110 can be integral with, or attached to, a corresponding waveguide 12, and can be aligned with a longitudinal center axis 112 of the corresponding waveguide. For example, the feed point $110_1$ can be aligned with the longitudinal center axis $112_1$ of the corresponding waveguide $12_1$, the feed point $110_2$ can be aligned with the longitudinal center axis $112_2$ of the corresponding waveguide $12_2$, and so on. Furthermore, because each waveguide 112 has its own, independent feed point 110, a signal generator (not shown in FIG. 9) can feed each waveguide with a signal having a different phase, a different amplitude, or both a different phase and a different amplitude, than at least one of the other signals.

Still referring to FIG. 9, alternate embodiments of the antenna 60 are contemplated. For example, one or more of the alternate embodiments described above in conjunction with FIGS. 6-8 can be applicable to the antenna 60 of FIG. 9. Furthermore, one or more of the feed points 110 can be located off of the corresponding longitudinal center axis(es) 112. Moreover, the feed points 110 can be located at the right ends of the waveguides 112 instead of at the left ends of the waveguides.

Figure 10:
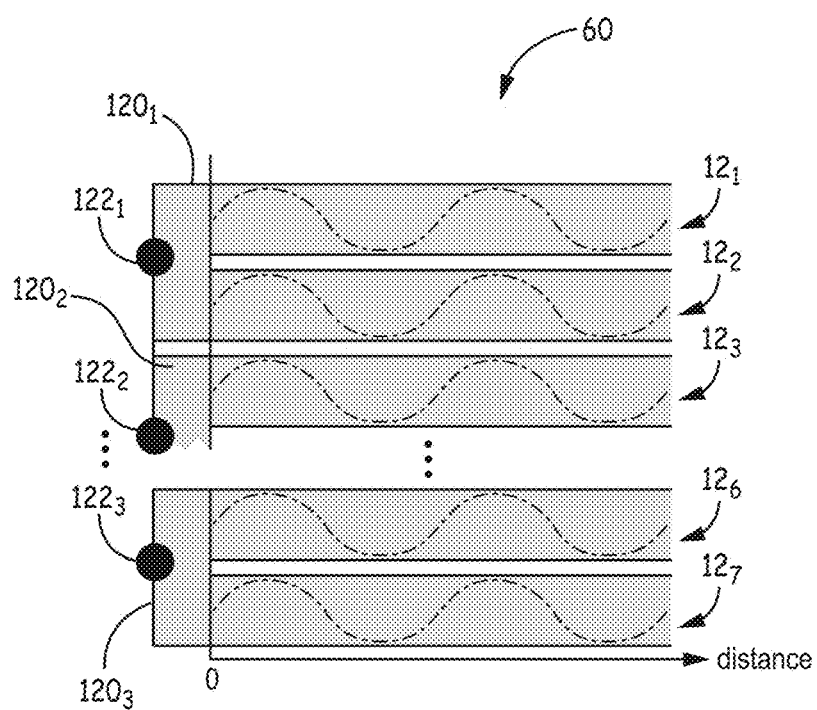
FIG. 10 is a plan view of a holographic-aperture antenna having multiple parallel transmission lines, here rectangular-strip waveguides, that are fed in groups, and overlays of the relative phases of the signals propagating along the respective waveguides as functions of position, according to an embodiment.

FIG. 10 is a plan view of the antenna 60 of FIG. 6, overlays of the relative phases of the signals propagating along the respective waveguides $12_1$-$12_7$, signal couplers $120_1$-$120_3$, and signal feed points $122_1$-$122_3$, according to an embodiment. The couplers 120, which can be made from an electrically conductive material, allow multiple waveguides 12 to be fed by the same signal. In the described embodiment, the coupler $120_1$ couples together the left ends of the waveguides $12_1$ and $12_2$ to a single feed point $122_1$; similarly, the coupler $120_2$ couples together the left ends of the waveguides $12_3$, $12_4$, and $12_5$ to a single feed point $122_2$, and the coupler $120_3$ couples together the left ends of the waveguides $12_6$ and $12_7$ to a single feed point $122_3$. Because the couplers 120 effectively divide the waveguides 112 into groups (three groups in this embodiment), a signal generator (not shown in FIG. 10) can feed each group of waveguides with a signal having a different phase, a different amplitude, or both a different phase and a different amplitude, than at least one of the other signals. For example, the signal generator can feed a first signal to the waveguides $12_1$ and $12_2$ via the feed point $122_1$ and the coupler $120_1$, can feed a second signal to the waveguides $12_3$-$12_5$ via the feed point $122_2$ and the coupler $120_2$, and can feed a third signal to the waveguides $12_6$ and $12_7$ via the feed point $122_3$ and the coupler $120_3$.

The couplers 120 can each divide the signal power equally among the waveguides 12 that it feeds, or can divide the signal power unequally.

Similarly, the couplers 120 can feed its waveguides 12 with signals having the same or different amplitudes and signals having the same or different phases. That is, a coupler 120 can shift the phase of the signal input to the corresponding feed point 122 differently for at least one waveguide 12, and can attenuate the amplitude of the signal input to the corresponding feed point different for at least one waveguide.

Still referring to FIG. 10, alternate embodiments of the antenna 60 are contemplated. For example, one or more of the alternate embodiments described above in conjunction with FIGS. 6-9 can be applicable to the antenna 60 of FIG. 10. Furthermore, the couplers 120 can couple together more than two or three waveguides 12, and the couplers and feed points 122 can be coupled to the right ends of the waveguides 12 instead of to the left ends. Moreover, the antenna 60 can include one or more waveguides 12 that are fed independently as described above in conjunction with FIG. 9, and two or more waveguides that are fed in groups as described in conjunction with FIG. 10.

Figure 11:
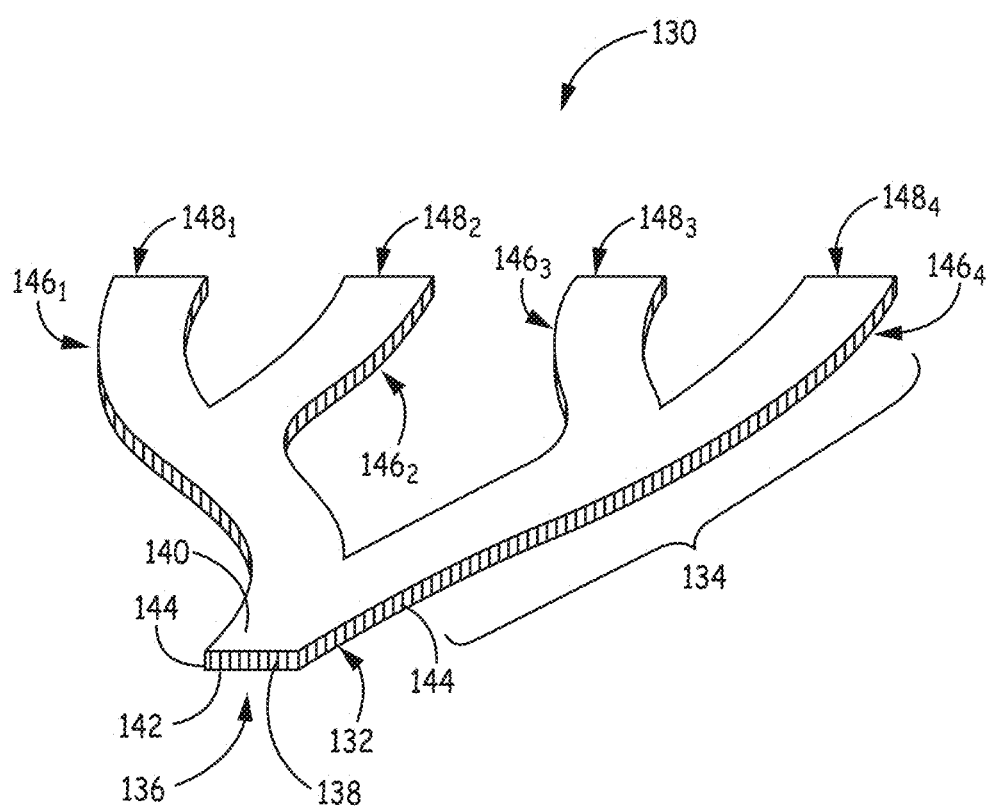
FIG. 11 is an isometric view of a signal feeder for independently driving each waveguide of the antenna of FIGS. 6 and 9, according to an embodiment.

FIG. 11 is an isometric view of a signal feeder 130 for feeding signals to the waveguides 12 of the antenna 60 of FIGS. 6 and 9-10, according to an embodiment.

The signal feeder 130 includes an input waveguide 132 and a power-divider-and-phase-shifter section 134 integral with the input waveguide. The section 134 divides an input signal coupled to the waveguide 132 into multiple output signals each having respective amplitudes and phases, and couples the output signal to respective feed points of the antenna 60 (FIGS. 6 and 9-10).

The input waveguide 132 includes an input port 136, and is formed from a dielectric 138, conductive surfaces 140 and 142 formed over opposite sides of the dielectric, and conductive vias 144 formed along the edges of the input waveguide. The spacing between the vias 144 is much smaller (e.g., 10 to 1000 times smaller) than the wavelength $\lambda_0$ for which the signal feed 130 is designed such that the vias "look like" a continuous conductor to signals at $\lambda_0$.

And the power-divider-and-phase-shifter section 134 includes multiple (here four) output waveguides $146_1$-$146_4$, which branch off from the input waveguide 132, and which each include a respective output port $148_1$-$148_4$. Each output waveguide 146 is designed to provide a respective attenuation and phase shift to an input signal fed to the input port 136. The respective attenuation provided by each output waveguide 146 can be the same as the attenuations provide by the other output waveguides, or can be different from the attenuation provided by at least one of the other output waveguides. Similarly, the respective phase shift provided by each output waveguide 146 can be the same as the phase shifts provided by the other output waveguides, or can be different from the phase shift provided by at least one of the other output waveguides. And the output ports $148_1$-$148_4$ couple the output signals from the output waveguides 146 to respective feed points of an antenna such as the feed points 110 of the antenna 60 of FIG. 9. Typically, the number of output waveguides 146 and output ports 148 is the same as the number of antenna feed points. For example, if designed to feed the antenna 60 of FIGS. 6 and 9, then the signal feeder 130 could have seven output waveguides $146_1$-$146_7$ and seven corresponding output ports $148_1$-$148_7$; and if designed to feed the antenna 60 of FIG. 10, then the signal feeder 130 could have three output waveguides $146_1$-$146_3$ and three corresponding output ports $148_1$-$148_3$.

Further details of the signal feeder 130 can be found in U.S. patent application Ser. No. 14/506,432, titled Surface Scattering Antennas With Lumped Elements, which was filed on 3 Oct. 2014 and which is incorporated by reference herein.

Still referring to FIG. 11, alternate embodiments of the signal feeder 130 are contemplated. For example one or more of the input waveguide 132 and the output waveguides 146 can be any other type of transmission line.

Figure 12:
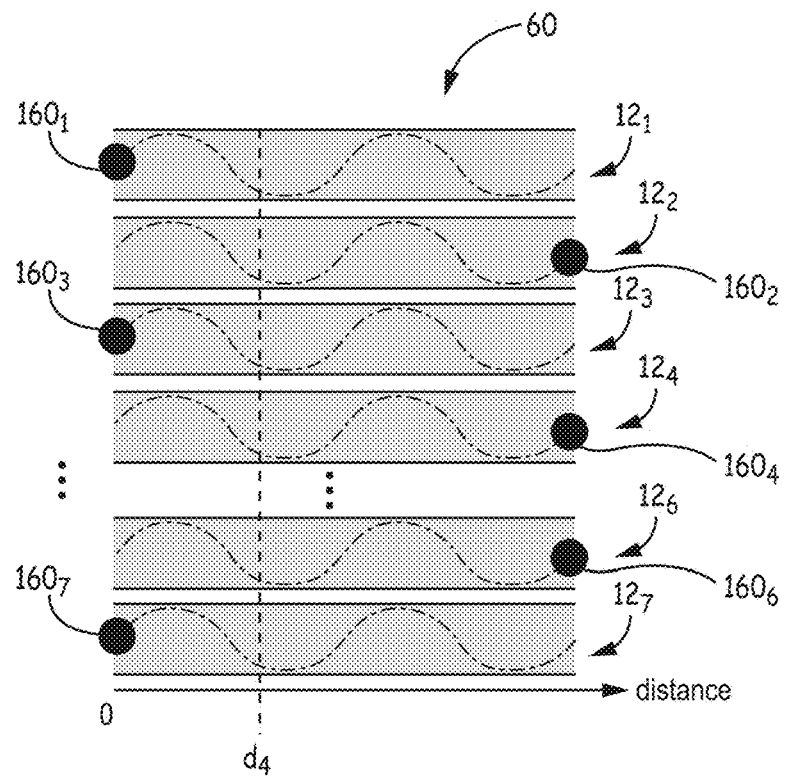
FIG. 12 is a plan view of the antenna of FIG. 6, and overlays of the relative phases of the signals propagating along the respective waveguides as a function of position, where the waveguides are independently fed at alternating ends, according to an embodiment.

FIG. 12 is a plan view of the antenna 60 of FIG. 6, overlays of the relative phases of the signals propagating along the respective waveguides $12_1$-$12_7$, and signal feed points $160_1$-$160_7$, according to an embodiment.

A difference between the antenna 60 of FIG. 9 and the antenna of FIG. 12 is that in FIG. 12, the feed points 160 are on different (here alternating) ends of the waveguides 12. The feed points $160_1$, $160_3$, $160_5$ (not shown in FIG. 12), and $160_7$ are located at the left ends of the waveguides $12_1$, $12_3$, $12_5$, and $12_7$ respectively; conversely, the feed points $160_2$, $160_4$, and $160_6$ are located at the right ends of the waveguides $12_2$, $12_4$, and $12_6$, respectively. All features of the antenna 60 of FIG. 12 other than the alternate locations of the feed points can be the same as the features of the antenna 60 of FIG. 9.

The feed points 160 being located at different ends of the waveguides 112 adds an independent variable, propagation direction, for improving side-lobe characteristics (e.g., reducing side-lobe power and increasing the magnitude of the side-lobe level) with little or no degradation of the main-beam characteristics. For example, with the feed points 160 located as described above and in FIG. 12, the directions (left-to-right) in which signals propagate along the waveguides $12_1$, $12_3$, $12_5$, and $12_7$ are approximately opposite to the directions (right-to-left) in which signals propagate along the waveguides $12_2$, $12_4$, and $12_6$. And even if the signals propagating along the waveguides 12 have the same amplitudes at the respective feed points 160, the signals have different amplitudes as a function of position along the waveguides. For example, the amplitude of the signal propagating along the waveguide $12_1$ decays from left to right, but the amplitude of the signal propagating along the waveguide $12_2$ decays from right to left. Therefore, an arbitrary distance $d_4$, the signals propagating along the waveguides $12_1$ and $12_2$ have different amplitudes (except at the distance where the amplitude plots of the signals propagating along the waveguides $12_1$ and $12_2$ cross over, i.e., intersect, one another) as well as different propagation directions. Consequently, locating at least one feed point 160 on an end of a corresponding waveguide 12, where the end is different from the feed-point end of at least one other waveguide, causes the momentum $\vec{k}$ of a signal propagating along a waveguide to be different from the momentum $\vec{k}$ of a signal propagating along at least one other waveguide. And of course to add additional design variables, a signal generator (not shown in FIG. 12) can feed each waveguide 12 with a signal having a different phase, a different amplitude, or both a different phase and a different amplitude, than at least one of the other signals.

Still referring to FIG. 12, alternate embodiments of the antenna 60 are contemplated. For example, one or more of the alternate embodiments described above in conjunction with FIGS. 6-10 can be applicable to the antenna 60 of FIG. 12. Furthermore, the feed points 160 need not alternate left-side, right-side as described above and as shown in FIG. 12, but can have any arrangement such that at least one feed point is located at different end of a waveguide 12 than at least one other feed point. Moreover, the waveguides 12 can be divided into groups by couplers 120 as described above in conjunction with FIG. 10, where some of the couplers can be coupled to different ends of the waveguides relative to other couplers.

Figure 13:
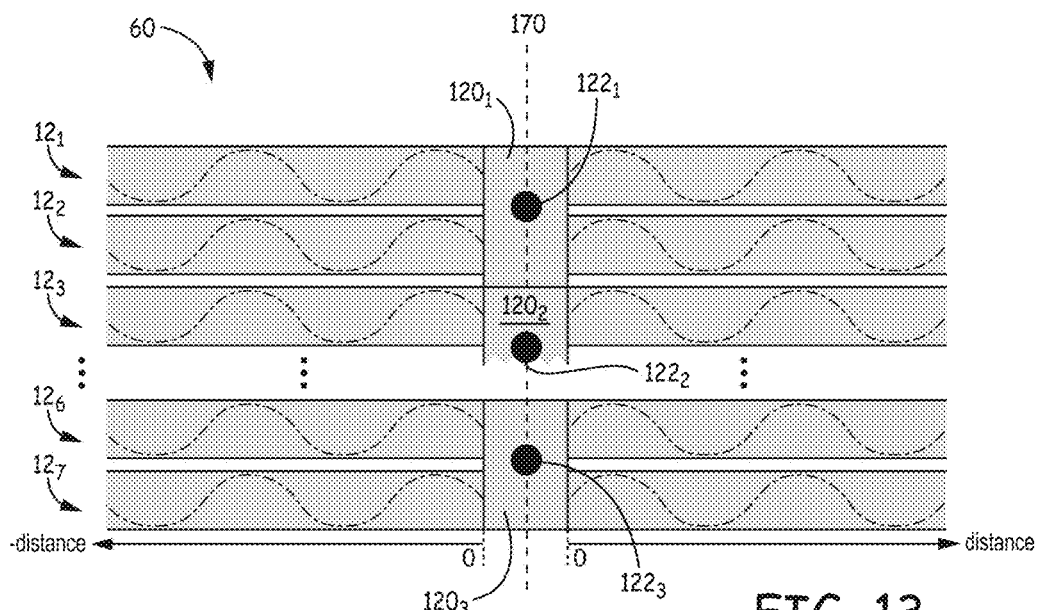
FIG. 13 is a plan view of the antenna of FIG. 6, and overlays of the relative phases of the signals propagating along the respective waveguides as functions of position, where the waveguides are fed in groups from interior portions of the waveguides, according to an embodiment.

FIG. 13 is a plan view of the antenna 60 of FIG. 6, overlays of the relative phases of the signals propagating along the respective waveguides $12_1$-$12_7$, signal couplers $120_1$-$120_3$, and signal feed points $122_1$-$122_3$, according to an embodiment.

A difference between the antenna 60 of FIG. 10 and the antenna of FIG. 13 is that the couplers 120 and the signal feed points 122 are located at the longitudinal midpoints 170 of the waveguides 12; otherwise, the features of the antenna of FIG. 60 can be similar to the features of the antenna of FIG. 10. Because the direction of signal propagation in the right-hand section of each waveguide 12 is different from the direction of signal propagation in the left-hand section of the waveguide, the midpoint locations of the couplers 120 and feed points add a variable, signal direction, that can adjusted to improve side-lobe characteristics (e.g., decrease side-lobe power and increase the magnitude of the side-lobe level) with little or no degradation to the main-beam characteristics.

Still referring to FIG. 13, alternate embodiments of the antenna 60 are contemplated. For example, one or more of the alternate embodiments described above in conjunction with FIGS. 6-10 and 12 can be applicable to the antenna 60 of FIG. 13. Furthermore, the couplers 120 can located at other than the longitudinal midpoints 170 of the waveguides 12. For example, the couplers 120 can be at different locations along the lengths of, or at the ends of, the waveguides 12, and the ability to place the couplers at different locations is a variable that a designer can adjust to obtain desired main-beam and side-lobe characteristics for the antenna 60. Moreover, the antenna 60 can include one or more waveguides 12 that are fed independently (without a coupler 120) as described above in conjunction with FIGS. 9 and 12, but where one or more of the feed points can be located along the lengths of the waveguides as well as at the ends of the waveguides.

Figure 14:
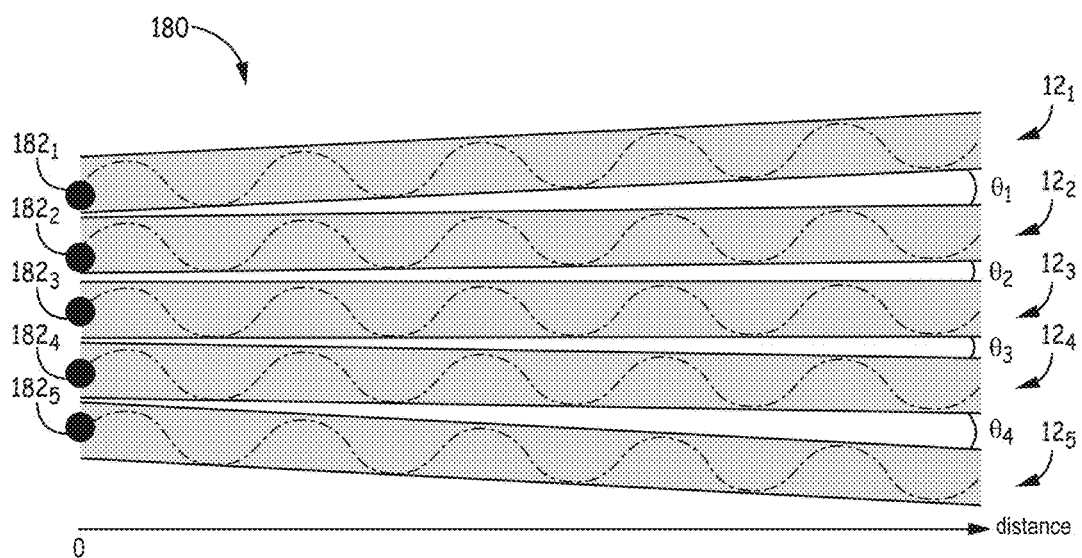
FIG. 14 is a plan view of a holographic-aperture antenna having multiple transmission lines, here rectangular-strip waveguides, and overlays of the relative phases of the signals propagating along the respective waveguides as a function of position, where the waveguides diverge from one another, according to an embodiment.

FIG. 14 is a plan view of a holographic-aperture antenna 180 having multiple rectangular-strip waveguides $12_1$-$12_5$, overlays of the relative phases of the signals propagating along the respective waveguides, and where the waveguides are not parallel to one another, according to an embodiment. The antenna 180 also includes antenna elements 14 arranged in one-dimensional arrays along the respective waveguides 12, although the antenna elements are omitted from FIG. 14 for clarity.

The waveguides $12_1$-$12_5$ diverge from one another such that if they extended further to the left, they would intersect at a common point (not shown in FIG. 14). That is, the waveguides effectively diverge from this common point or location. Each waveguide 12 is separated from an adjacent waveguide by an angle of divergence θ. The angles θ may be the same, or one of the angles can be different from at least one of the other angles.

Because the waveguides $12_1$-$12_5$ are not parallel to one another (they diverge from one another in a left-to-right direction in the described embodiment), the signals that propagate along the waveguides have different propagation directions, which is a variable, direction difference (and, therefore, momentum difference), that a designer can adjust to obtain desired main-beam and side-lobe characteristics.

Still referring to FIG. 14, alternate embodiments of the antenna 180 are contemplated. For example, one or more of the alternate embodiments described above in conjunction with FIGS. 6-10 and 12-13 can be applicable to the antenna 180 of FIG. 14. Furthermore, although feed points $182_1$-$182_5$ are described as being one per waveguide 12 and being located at the left ends of the waveguides, couplers, such as the couplers 120 of FIGS. 10 and 13, can be included to subdivide the waveguides 12 into one or more groups, and one or more of the feed points and couplers can each be positioned at any location (e.g., an interior location, a right end) along a respective one the waveguides other than the left end. Moreover, at least one of the signals can have a different phase, a different amplitude, or both a different phase and a different amplitude, than at least one other of the signals. In addition, although described as being rectangular, one or more of the waveguides 12 can have a shape other than rectangular. For example, one or more of the waveguides 12 can expand in the direction of divergence (left to right in the embodiment described in conjunction with FIG. 14) such that these one or more waveguides have a triangular or trapezoidal shape.

Figure 15:
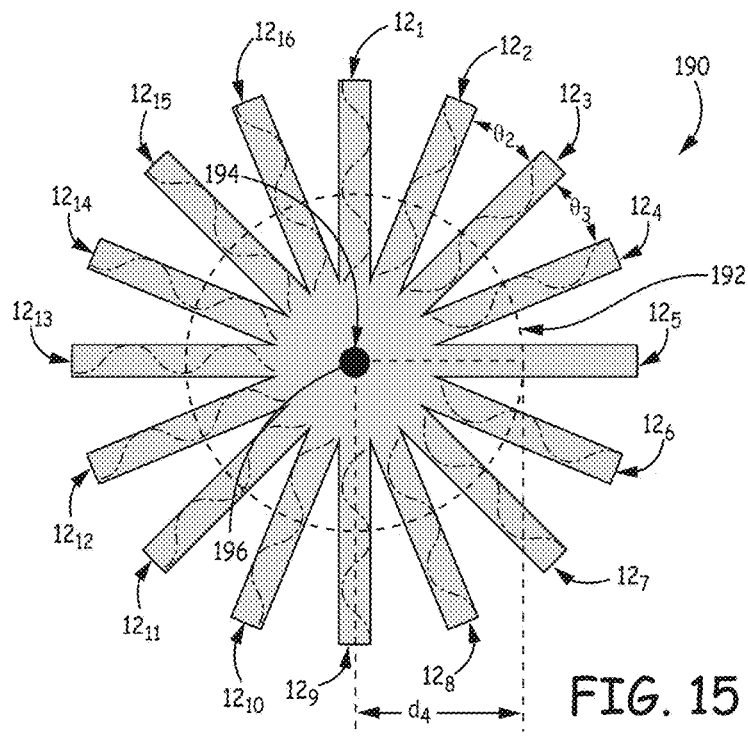
FIG. 15 is a plan view of a holographic-aperture antenna having multiple transmission lines, here rectangular-strip waveguides, that emanate from a common waveguide portion, and overlays of the phases of the signals propagating along the respective waveguides as a function of position, according to an embodiment.

FIG. 15 is a plan view of a holographic-aperture antenna 190 having multiple rectangular-strip waveguides $12_1$-$12_{16}$, overlays of the relative phases of the signals propagating along the respective waveguides, and where the waveguides emanate from a common waveguide section 192, according to an embodiment. The antenna 190 also includes antenna elements 14 arranged in one-dimensional arrays along the respective waveguides 12, although the antenna elements are omitted from FIG. 15 for clarity.

The waveguides $12_1$-$12_{16}$ diverge from a center 194 of the common section 192, and each waveguide 12 is separated from an adjacent waveguide by an angle of divergence θ=360/n, where n equals the number of waveguides (here sixteen). Therefore, the waveguides $12_1$-$12_{16}$ emanate from the common section 192 like spokes emanate from the hub of a bicycle wheel.

The waveguides $12_1$-$12_{16}$ are fed by a common signal at a feed point 196, which is at the center 194 of the common section 192; therefore, the signals that propagate long the waveguides 12 have the same amplitude and phase at an arbitrary radial distance $d_4$, i.e., the signals present a uniform wave front at $d_4$.

But because the waveguides $12_1$-$12_{16}$ are not parallel to one another, the signals that propagate along the waveguides 12 have different propagation directions, which adds a variable, direction difference (and, therefore, momentum $\vec{k}$ difference), that a designer can adjust to obtain desired main-beam and side-lobe characteristics.

Still referring to FIG. 15, alternate embodiments of the antenna 190 are contemplated. For example, one or more of the alternate embodiments described above in conjunction with FIGS. 6-10 and 12-14 can be applicable to the antenna 190 of FIG. 15. Furthermore, the antenna 190 is described as being fed from a single feed point 196 located at the center 194 of the common waveguide portion 192, the antenna can include one or more feed points positioned at any locations of the common portion 192 or of the waveguides 12 other than the center 194. For example, sixteen feed points may each be located at an end of a respective one of the waveguides $12_1$-$12_{16}$ such that the signals all propagate toward the center 194 of the common portion 192; this provides additional variables for adjustment of the main-beam and side-lobe characteristics because at least one of the signals can have a different phase, a different amplitude, or a different phase and a different amplitude, as compared to at least one of the other signals. Moreover, instead of a single feed point 196, the antenna 190 can include a distributed feeder (e.g., a cylindrical feeder) that imparts a phase shift, amplitude attenuation, or both a phase shift and amplitude attenuation as a function of distance around the feeder such that the signal fed to at least one of the waveguides 12 has a different phase, a different amplitude, or both a different phase and different amplitude, than a signal fed to one or more of the other waveguides. And such a distributed feed can be dynamically adjustable so that amplitude, phase, or both amplitude and phase of the signal at respective locations along the distributed feed can be dynamically adjustable. In addition, couplers, such as the couplers 120 of FIGS. 10 and 13, can be included to subdivide the waveguides 12 into one or more common-feed groups. Furthermore, although described as including sixteen waveguides 12, the antenna 190 can include any number of multiple waveguides. Moreover, although described as being separated by a uniform angle θ, at least one pair of adjacent waveguides can be separated by a different angle than other pairs of adjacent waveguides. In addition, the ends of the waveguides 12 remote from the common section 192 can be curved, instead of straight, to conform to an arc of a circle having a radius equal to the lengths of the waveguides from the center 194. Furthermore, one or more of the waveguides 12 can have a different length, a different shape, or both a different length or different shape than at least one of the other waveguides. Moreover, in addition to including antenna elements 14 disposed over the waveguides 12, the antenna 190 can include antenna elements 14 disposed over the common section 192 in line with the antenna elements along the waveguides 12 or arranged otherwise.

Figure 16:
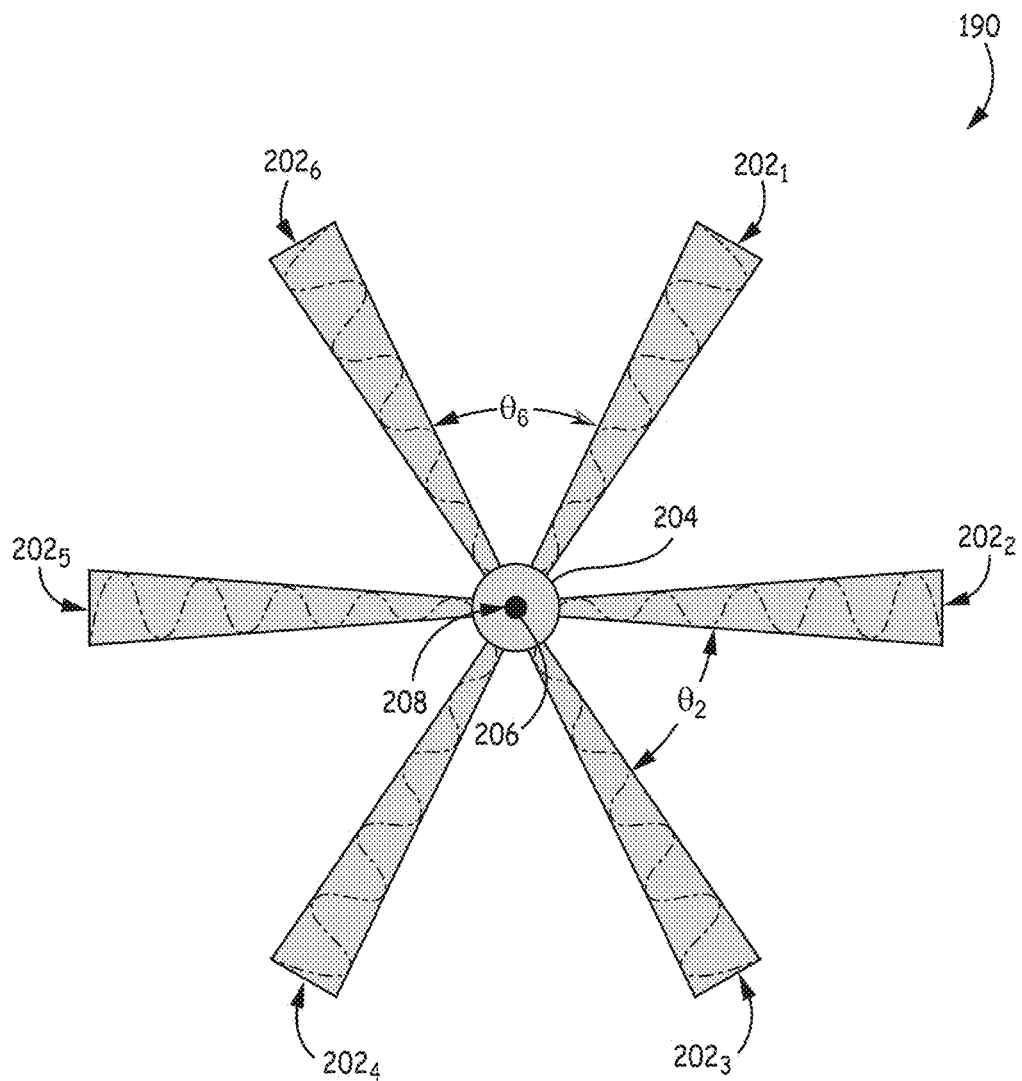
FIG. 16 is a plan view of a holographic-aperture antenna having multiple transmission lines, here trapezoidal-strip waveguides, that emanate from a common waveguide portion, and overlays of the phases of the signals propagating along the respective waveguides as functions of position, according to an embodiment.

FIG. 16 is a plan view of a holographic-aperture antenna 200 having multiple trapezoidal-strip waveguides $202_1$-$202_6$, overlays of the relative phases of the signals propagating along the respective waveguides, and where the waveguides emanate from a common waveguide section 204, according to an embodiment. Other than their trapezoidal shape, the waveguides 202 can have a structure similar to the structure of the waveguides 12 of FIGS. 1-3. The antenna 200 also includes antenna elements 14 arranged in one-dimensional arrays along the respective waveguides 202, although the antenna elements are omitted from FIG. 16 for clarity.

The antenna 200 is similar to the antenna 190 of FIG. 15, except that the waveguides 202 are not rectangular like the waveguides 12, but expand with radial distance from the common section 204 such that these expanding waveguides have a triangular or trapezoidal shape.

The waveguides $202_1$-$202_6$ diverge from a center 206 of the common section 204, and each waveguide 202 is separated from an adjacent waveguide by an angle of divergence θ=360/n, where n equals the number of waveguides (here six). Therefore, the waveguides $202_1$-$202_6$ emanate from the common section 204 like spokes emanate from the hub of a bicycle wheel.

The waveguides $202_1$-$202_6$ are feed by a common signal at a feed point 208, which is at the center 206 of the common section 204; therefore, the signals that propagate long the waveguides 202 have the same amplitude profile and phase profile.

But because the waveguides $202_1$-$202_6$ are not parallel to one another, the signals that propagate along the waveguides 202 have different propagation directions, which adds a variable, direction difference (and, therefore, momentum difference), that a designer can adjust to obtain desired main-beam and side-lobe characteristics.

Still referring to FIG. 16, alternate embodiments of the antenna 200 are contemplated. For example, one or more of the alternate embodiments described above in conjunction with FIGS. 6-10 and 12-15 can be applicable to the antenna 200 of FIG. 16. Furthermore, although the antenna 200 is described as being feed from a single feed point 208 located at the center 206 of the common waveguide section 204, the antenna can include multiple feed points positioned at any locations of the common portion 204 or of the waveguides 202. For example, six feed points may each be located at an end of a respective one of the waveguides $202_1$-$202_6$ such that the signals all propagate toward the center 206 of the common portion 204; this provides additional variables for adjustment of the main-beam and side-lobe characteristics because at least one of the signals can have a different phase, a different amplitude, or a different phase and a different amplitude, as compared to at least one of the other signals. Moreover, couplers, such as the couplers 120 of FIGS. 10 and 13, can be included to subdivide the waveguides 202 into one or more common-feed groups. In addition, although described as including six waveguides $202_1$-$202_6$, the antenna 200 can include any number of multiple waveguides. Furthermore, although described as being separated by a uniform angle θ, at least one pair of adjacent waveguides 202 can be separated by a different angle than other pairs of adjacent waveguides. Moreover, the ends of the waveguides 202 remote from the common section 204 can be curved, instead of straight, to conform to an arc of a circle having a radius equal to the lengths of the waveguides from the center 206.

Figure 17:
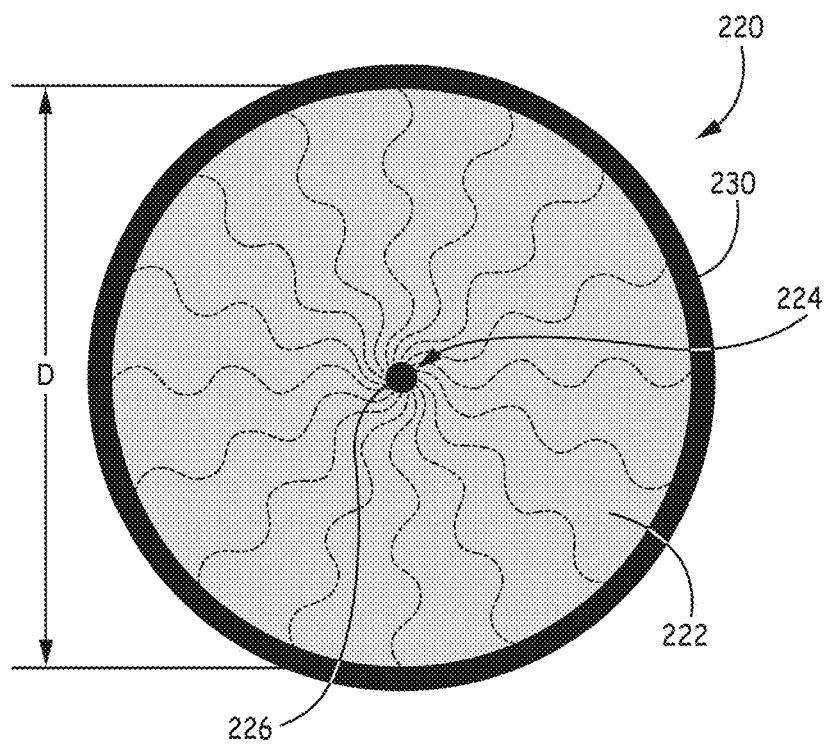
FIG. 17 is a plan view of a holographic-aperture antenna having a circular transmission line, here a circular waveguide, with a center cylindrical feed, and an overlay of the relative phases of radial components of the signal propagating outward along the waveguide as functions of position, according to an embodiment.

FIG. 17 is a plan view of a holographic-aperture antenna 220 having a circular waveguide 222 with a feed point 224 at a center 226 of the waveguide, and of an overlay of the phase of the signal propagating along the waveguide, according to an embodiment. The antenna 220 also includes antenna elements 14 arranged in one-dimensional arrays along respective radii of the waveguides 222, although the antenna elements are omitted from FIG. 16 for clarity. As the radial distance increases, antenna elements 14 can be added along additional radii as space permits. Alternatively, the antenna elements 14 can be arranged in a grid pattern (i.e., in rows and columns).

Figure 18:
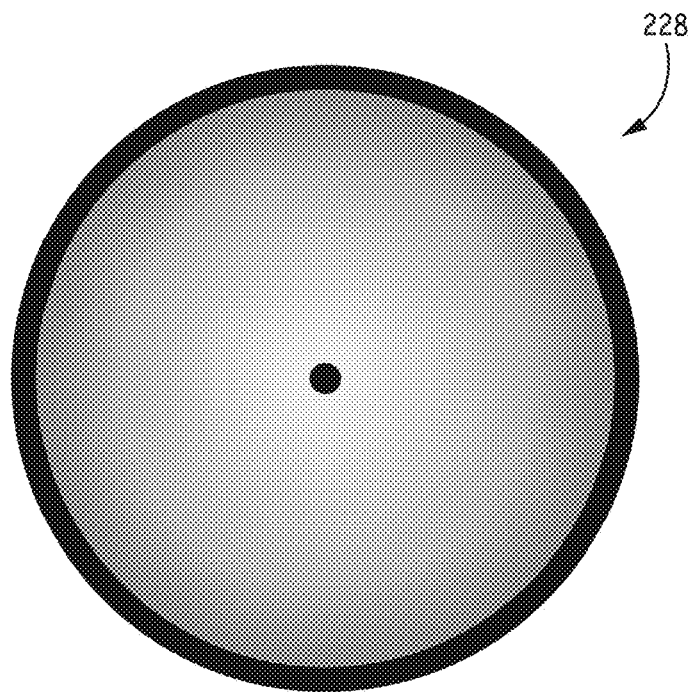
FIG. 18 is a plot of the normalized amplitudes of radial components of the signal propagating outward along the waveguide of FIG. 17 as a function of position, according to an embodiment.

FIG. 18 is a plot of the amplitude 228 of the antenna 220 of FIG. 17 as a function of radial distance, according to an embodiment. The amplitude of the signal decreases exponentially with radial distance from the center 226 of the waveguide 222.

Referring to FIGS. 17-18, the circular waveguide has a diameter D of any suitable length, for example, between approximately $3\lambda_0$–$20/\lambda_0$, where $\lambda_0$ is the wavelength for which the antenna 220 is designed.

The waveguide 222 can have a structure similar to that described above for the waveguides 12 in conjunction with FIGS. 1-3.

The antenna 220 also can include an optional signal-terminator 230, which can be included if the diameter D is not wide enough to allow attenuation of the signal to approximately zero amplitude at the edge of the waveguide 222.

Although the antenna 220 is fed with only one signal at the cylindrical feed point 224, as the signal propagates radially outward from the feed point along the waveguide 222, each portion of the signal that propagates along a respective radial line of the waveguide (theoretically there are an infinite number of such portions of the signal) has a different propagation direction, and thus a different momentum $\vec{k}$, from all of the other signal portions. That is, the signal presents a uniform wave front at an arbitrary radius $d_4$ (see FIG. 15).

The different momentums $\vec{k}$ along each radial line of the waveguide 222 provide a variable that a designer can use to obtain desired main-beam characteristics and side-lobe characteristics.

To provide additional variables, a designer can replace or supplement the feed point 224 with a distributed feed, such as a cylindrical feed (not shown in FIGS. 17-18) around the center 226, so that the amplitude, phase, or both the amplitude and phase, of the signal can be made to be different at respective locations of the waveguide 222 along the distributed feed. And such a distributed feed can be dynamically adjustable so that amplitude, phase, or both amplitude and phase of the signal at respective locations along the distributed feed can be dynamically adjustable.

Still referring to FIGS. 17-18, alternate embodiments of the antenna 220 are contemplated. For example, one or more of the alternate embodiments described above in conjunction with FIGS. 6-10 and 12-16 can be applicable to the antenna 220 of FIG. 17. Furthermore, although the antenna 220 is described as being fed from a single feed point 224 located at the center 226 of the waveguide 222, the antenna can include multiple feed points positioned at any locations of the waveguides 222. Moreover, the waveguide 222 can have a shape other than circular.

Figure 19:
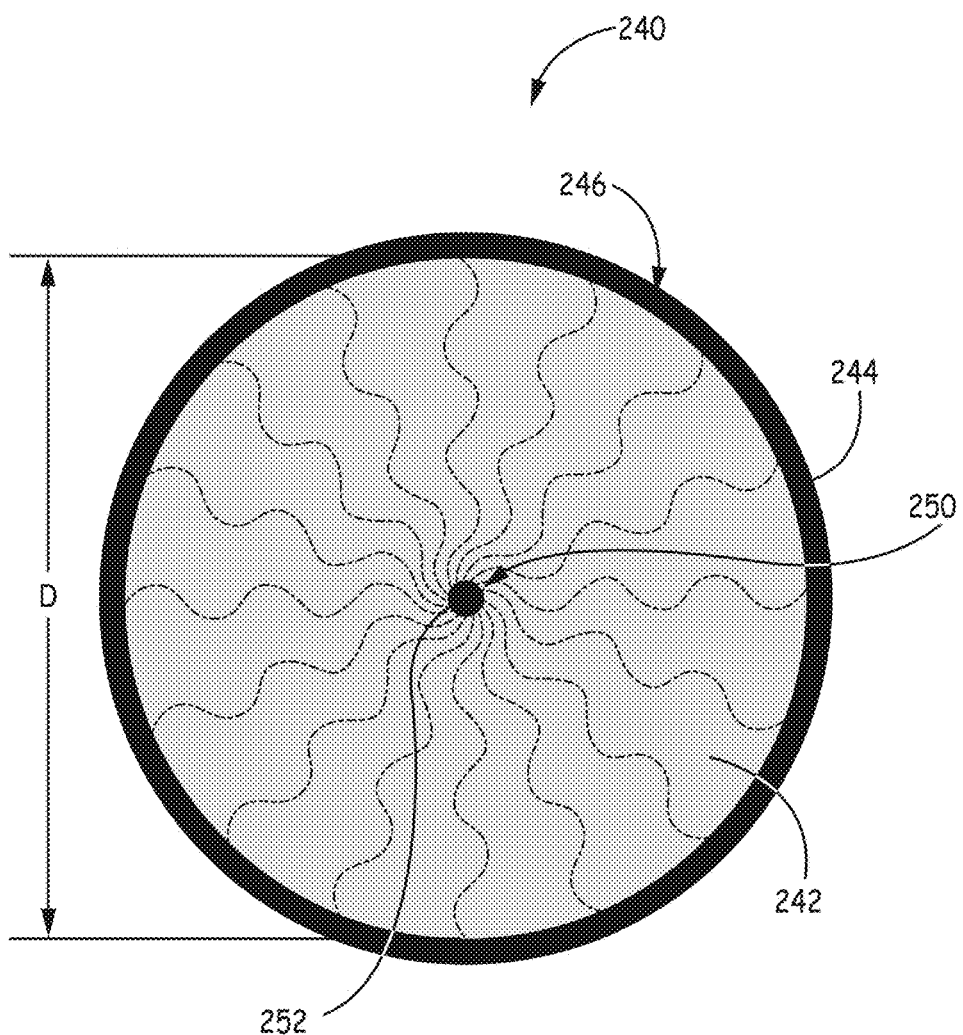
FIG. 19 is a plan view of a holographic-aperture antenna having a circular transmission line, here a circular waveguide, with a peripheral feed along its circumference, and an overlay of the phases of radial components of the signal propagating inward along the waveguide as functions of position, according to an embodiment.

FIG. 19 is a plan view of a holographic-aperture antenna 240 having a circular waveguide 242 with a distributed feed region 244 along the periphery 246 of the waveguide, and an overlay of the phase of the signal propagating along the waveguide, according to an embodiment. The antenna 240 also includes antenna elements 14 arranged in one-dimensional arrays along respective radii of the waveguide 242, although the antenna elements are omitted from FIG. 19 for clarity. As the radial distance increases, antenna elements 14 can be added along additional radii as space permits. Alternatively, the antenna elements 14 can be arranged in a grid pattern (i.e., in rows and columns).

The plot of the amplitude of the signal propagating along the waveguide 242 can be the inverse of the amplitude plot 228 (FIG. 18) of the antenna 220 of FIG. 17, such that the amplitude of the signal decreases exponentially with radial distance from the periphery 246 of the waveguide 242.

The circular waveguide 242 has a diameter D of any suitable length, for example, between approximately $3\lambda_0$–$20\lambda_0$, where $\lambda_0$ is the wavelength for which the antenna 240 is designed.

The antenna 240 also includes, at the center 250 of the waveguide 242, an optional signal-terminator 252, which can be included if the diameter D is not wide enough to allow attenuation of the signal to approximately zero amplitude at the center of the waveguide 242.

Although the antenna 240 is fed with only one signal at the distributed feed region 244, as the signal propagates radially inward from the feed region along the waveguide 242, each portion of the signal that propagates along a respective radial line of the waveguide (theoretically there are an infinite number of such portions of the signal) has a different propagation direction, and thus a different momentum $\vec{k}$, from all of the other signal portions.

The different momentums $\vec{k}$ along each radial line of the waveguide 242 provide another variable that a designer can use to obtain desired main-beam characteristics and side-lobe characteristics.

To provide other variables, a designer can design the distributed feed region 244 so that the amplitude, phase, or both the amplitude and phase, of the signal can be made to be different at respective locations along the periphery 246 of the waveguide 242. And such a distributed feed region 244 can be dynamically adjustable (e.g., can have an adjustable impedance) so that amplitude, phase, or both amplitude and phase of the signal at respective positions around the periphery 246 can be dynamically adjustable.

Still referring to FIG. 19, alternate embodiments of the antenna 240 are contemplated. For example, one or more of the alternate embodiments described above in conjunction with FIGS. 6-10 and 12-18 can be applicable to the antenna 240 of FIG. 19. Furthermore, although the antenna 240 is described as being fed from a distributed feed region 244 around the periphery 246 of the waveguide 242, the antenna can include one or more feed points or feed regions positioned at any locations of the waveguides 242, and such a feed region can allow dynamic adjustment of the amplitude, phase, or both the amplitude and phase, of the signal coupled to the waveguide 242 via the feed region. Moreover, the waveguide 242 can have a shape other than circular.

Figure 20:
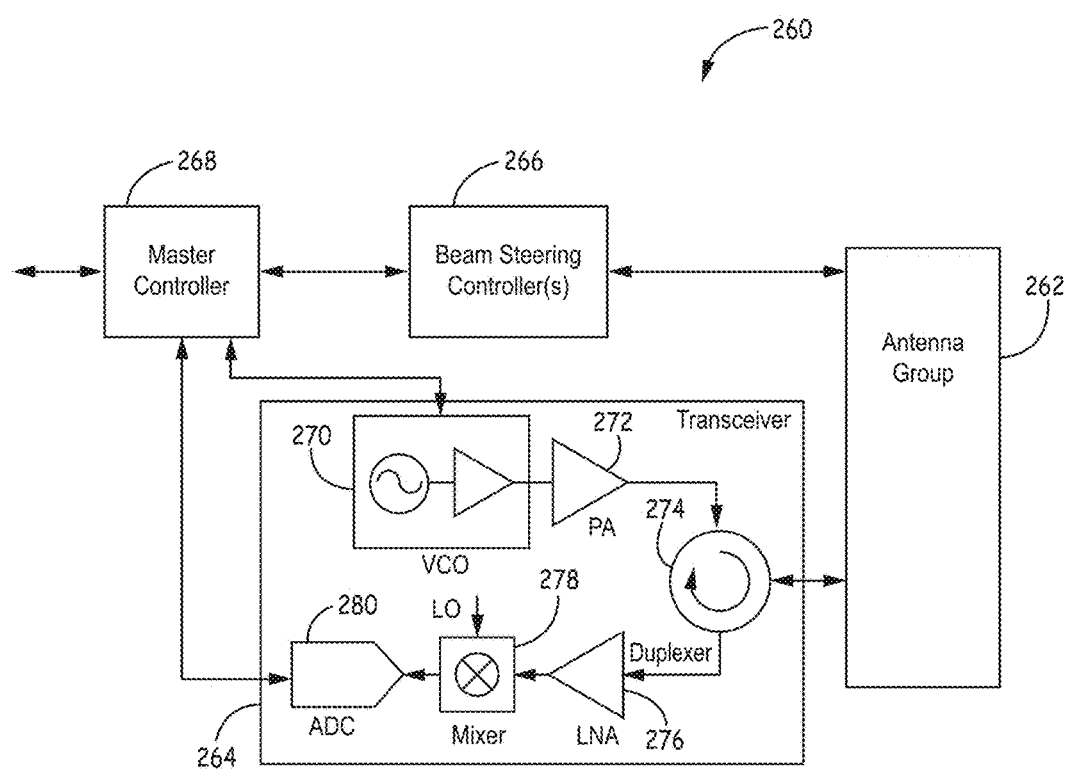
FIG. 20 is a block diagram of a radar subsystem having an antenna unit that includes one or more of the antennas of FIGS. 6, 9, and 12-19, according to an embodiment.

FIG. 20 is a block diagram of a radar subsystem 260, which includes an antenna group 262 including one or more of the antennas of FIGS. 6, 9-10, 12-17, and 19, according to an embodiment.

In addition to the antenna group 262, the radar subsystem 260 includes a transceiver 264, a beam-steering controller 266, and a master controller 268.

The transceiver 264 includes a voltage-controlled oscillator (VCO) 270, a preamplifier (PA) 272, a duplexer 274, a low-noise amplifier (LNA) 276, a mixer 278, and an analog-to-digital converter (ADC) 280. The VCO 270 is configured to generate a signal having a frequency $f_0 = c/\lambda_0$, which is the frequency for which at least one of the antennas of the antenna group 262 is designed. The PA 272 is configured to amplify the VCO signal, and the duplexer 274 is configured to couple the signal to the antennas of the antenna group 262 via one or more signal feeders (not shown in FIG. 20) such as the feeder 130 of FIG. 11. One or both of the duplexer 274 and antenna group 262 can include one or more of the signal feeders. The duplexer 274 is also configured to receive signals from the antennas of the antenna group 262, and to provide these received signals to the LNA 276, which is configured to amplify these received signals. The mixer 278 is configured to shift the frequencies of the amplified received signals down to a base band, and the ADC 280 is configured to convert the down-shifted analog signals to digital signals for processing by the master controller 268.

The beam-steering controller 266 is configured to steer the beams (both transmitting and receiving beams) generated by the one or more antennas of the antenna group 262 by generating the control signals to the antenna units 28 (see, e.g., FIG. 3) as a function of time and main-beam position. As described above in conjunction with FIGS. 1-5, by appropriately generating the control signals, the beam-steering controller 266 is configured to selectively activate and deactivate the antenna elements 14 according to selected spatial and temporal patterns. And if the one or more signal feeders (not shown in FIG. 20) are dynamically configurable to shift the phase or to alter the amplitude of a fed signal, then the beam-steering controller 266 also is configured to control the one or more signal feeders with one or more feeder control signals.

The master controller 268 is configured to control the transceiver 264 and the beam-steering controller 266, and to analyze the digital signals from the ADC 280. For example, assuming that the one or more antennas of the antenna group 262 are designed to operate at frequencies in a range centered about $f_0$, the master controller 268 is configured to adjust the frequency of the signal generated by the VCO 270 for, e.g., environmental conditions such as weather, the average number of objects in the range of the one or more antennas of the antenna assembly, and the average distance of the objects from the one or more antennas, and to conform the signal to spectrum regulations. Furthermore, the master controller 268 is configured to analyze the signals from the ADC 280 to, e.g., identify a detected object, and to determine what action, if any, that a system including, or coupled to, the radar subsystem 260 should take. For example, if the system is a self-driving vehicle or a self-directed drone, then the master controller 268 is configured to determine what action (e.g., braking, swerving), if any, the vehicle should take in response to the detected object.

Operation of the radar subsystem 270 is described below, according to an embodiment. Any of the system components, such as the master controller 268, can store in a memory, and execute, software/program instructions to perform the below-described actions. Alternatively any of the system components, such as the system controller 268, can store, in a memory, firmware that when loaded configures one or more of the system components to perform the below-described actions. Or any of the system components, such as the system controller 268, can be hardwired to perform the below-described actions.

The master controller 268 generates a control voltage that causes the VCO 270 to generate a signal at a frequency within a frequency range centered about $f_0$. For example, $f_0$ can be in the range of approximately 5 Gigahertz (GHz)-100 GHz.

The VCO 270 generates the signal, and the PA 272 amplifies the signal and provides the amplified signal to the duplexer 274.

The duplexer 274 can further amplify the signal, and couples the amplified signal to the one or more antennas of the antenna group 262.

While the duplexer 274 is coupling the signal to the one or more antennas of the antenna group 262, the beam-steering controller 266, in response to the master controller 268, is generating control signals to the antenna units 28 (FIG. 3) of the one or more antennas, and, if one or more dynamic signal feeders are present, the beam-steering controller also is generating control signals to these feeders. These control signals cause the one or more antennas to generate and to steer one or more main signal-transmission beams. As described above in conjunction with FIGS. 6-19, the control signals cause the one or more main signal-transmission beams to have desired characteristics, and also cause the side lobes to have desired characteristics such as suitable total side-lobe power and a suitable side-lobe level (e.g., between the smallest main signal-transmission beam and the largest side lobe).

Then, the master controller 268 causes the VCO 270 to cease generating the signal.

Next, while the VCO 270 is generating no signal, the beam-steering controller 266, in response to the master controller 268, generates control signals to the antenna units 28 (FIG. 3) of the one or more antennas, and, if one or more dynamic signal feeders are present, the beam-steering controller is generating control signals to these feeders. These control signals cause the one or more antennas to generate and to steer one or more main signal-receive beams. As described above in conjunction with FIGS. 6-19, the control signals cause the one or more main signal-receive beams to have desired characteristics, and also cause the side lobes to have desired characteristics such as suitable total side-lobe power and a suitable side-lobe level. Furthermore, the beam-steering controller 266 can generate the same sequence of control signals for steering the one or more main signal-receive beams as it does for steering the one or more main signal-transmit beams.

Then, the duplexer 274 couples signals received by the one or more antennas of the antenna subassembly 262 to the LNA 276.

Next, the LNA 272 amplifies the received signals.

Then, the mixer 278 down-converts the amplified received signals from a frequency, e.g., at or near $f_0$, to a baseband frequency.

Next, the ADC 280 converts the analog down-converted signals to digital signals.

Then, the master system controller 268 analyzes the digital signals to obtain information from the signal and to determine what, if anything, should be done in response to the information obtained from the signal.

The master system controller 268 can repeat the above cycle one or more times.

Still referring to FIG. 20, alternate embodiments of the radar subsystem 260 are contemplated. For example, the radar subsystem 260 can include one or more additional components not described above, and can omit one or more of the above-described components.

Figure 21:
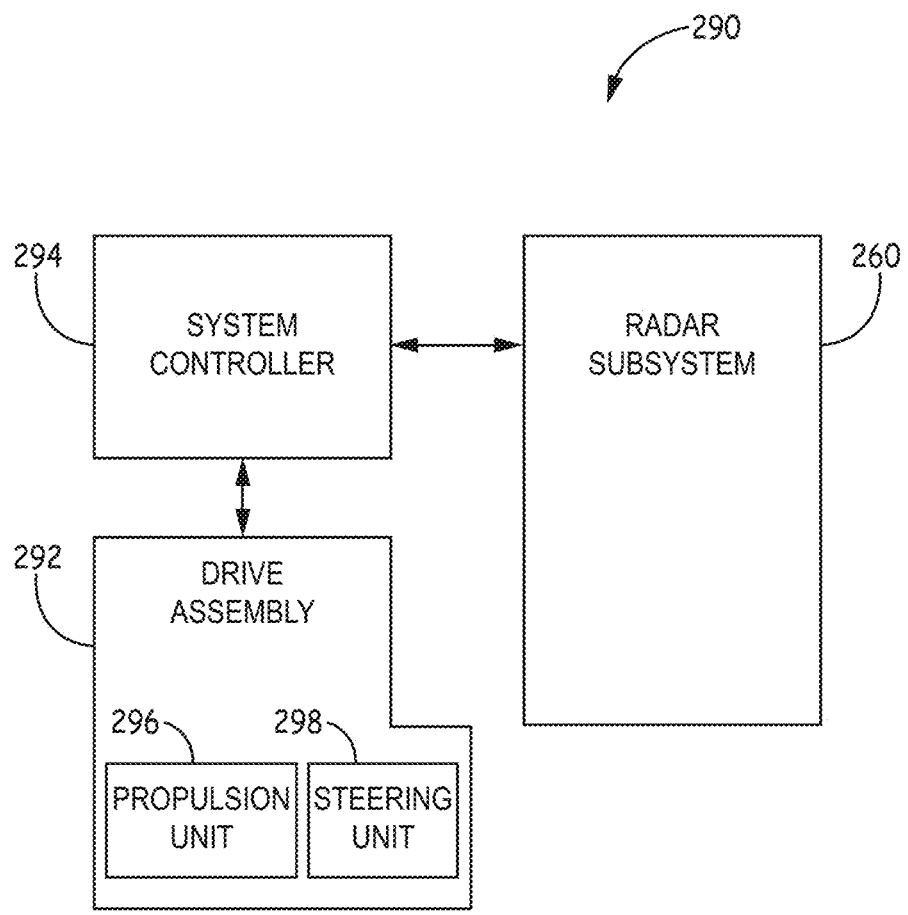
FIG. 21 is a block diagram of a system, such as a vehicle, that includes the radar subsystem of FIG. 20, according to an embodiment.

FIG. 21 is a block diagram of a system, such as a vehicle system 290, which includes the radar subsystem 260 of FIG. 20, according to an embodiment. For example, the vehicle system 290 can be an unmanned aerial vehicle (UAV) such as a drone, or a self-driving car.

In addition to the radar subsystem 260, the vehicle system 290 includes a drive assembly 292 and a system controller 294.

The drive assembly 292 includes a propulsion unit 296, such as an engine or motor, and a steering unit 298, such as a rudder, flaperon, pitch control, or yaw control (for, e.g., an UAV or drone), or a steering wheel linked to steerable wheels (for, e.g., a self-driving car).

The system controller 294 is configured to control, and to receive information from, the radar subsystem 260 and the drive assembly 292. For example, the system controller 294 can be configured to receive locations, sizes, and speeds of nearby objects from the radar subsystem 260, and to receive the speed and traveling direction of the vehicle system 290.

Operation of the vehicle system 290 is described below, according to an embodiment. Any of the system components, such as the system controller 294, can store in a memory, and execute, software/program instructions to perform the below-described actions. Alternatively any of the system components, such as the system controller 294, can store, in a memory, firmware that when loaded configures one or more of the system components to perform the below-described actions. Or any of the system components, such as the system controller 294, can be circuitry hardwired to perform the below-described actions.

The system controller 294 activates the radar subsystem 260, which, as described above in conjunction with FIG. 20, provides to the system controller information regarding one or more objects in the vicinity of the vehicle system 290. For example, if the vehicle system 290 is an UAV or a drone, then the radar subsystem can provide information regarding one or more objects (e.g., birds, aircraft, and other UAVs/drones), in the flight path to the front, sides, and rear of the UAV/drone. Alternatively, if the vehicle system 290 is a self-driving car, then the radar subsystem 260 can provide information regarding one or more objects (e.g., other vehicles, debris, pedestrians, bicyclists) in the roadway to the front, sides, and rear of the vehicle system.

In response to the object information from the radar subsystem 260, the system controller 294 determines what action, if any, the vehicle system 290 should take in response to the object information. Alternatively, the master controller 268 (FIG. 20) of the radar subsystem can make this determination and provide it to the system controller 294.

Next, if the system controller 294 (or master controller 268 of FIG. 20) determined that an action should be taken, then the system controller causes the drive assembly 292 to take the determined action. For example, if the system controller 294 or master controller 268 determined that a UAV system 290 is closing on an object in front of the UAV system, then the system controller 294 can control the propulsion unit 296 to reduce air speed. Or, if the system controller 294 or master controller 268 determined that an object in front of a self-driving system 290 is slowing down, then the system controller 294 can control the propulsion unit 296 to reduce engine speed and to apply a brake. Or if the system controller 294 or master controller 268 determined that evasive action is needed to avoid an object (e.g., another UAV/drone, a bird, a child who ran in front of the vehicle system 290) in front of the vehicle system, then the system controller 294 can control the propulsion unit 296 to reduce engine speed and, for a self-driving vehicle, to apply a brake, and can control the steering unit 298 to maneuver the vehicle system away from or around the object.

Still referring to FIG. 21, alternate embodiments of the vehicle system 290 are contemplated. For example, the vehicle system 290 can include one or more additional components not described above, and can omit one or more of the above-described components. Furthermore, the vehicle system 290 can be a vehicle system other than a UAV, drone, or self-driving car. Other examples of the vehicle system 290 include a watercraft, a motor cycle, a car that is not self-driving, and a space craft. Moreover, a system including the radar subsystem 260 can be other than a vehicle system.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

What is claimed is:

1. An antenna, comprising:
a first transmission line configured to guide a first guided signal such that the first guided signal has a characteristic of a first value;
first antenna elements each disposed adjacent to the first transmission line and each configured to radiate a respective first transmit signal in response to the first guided signal and in response to a respective first control signal;
a second transmission line configured to guide a second guided signal such that the second guided signal has the characteristic of a second value that is different than the first value; and
second antenna elements each disposed adjacent to the second transmission line and each configured to radiate a respective second transmit signal in response to the second guided signal and in response to a respective second control signal.

2. The antenna of claim 1 wherein:
the first antenna elements are arranged in a first one-dimensional array; and
the second antenna elements are arranged in a second one-dimensional array.

3. The antenna of claim 1 wherein;
the first transmission line includes a first waveguide; and
the second transmission line includes a second waveguide.

4. The antenna of claim 1 wherein:
the first transmission line is rectangular; and
the second transmission line is rectangular.

5. The antenna of claim 1 wherein:
the first transmission line is circular; and
the second transmission line is circular.

6. The antenna of claim 1 wherein:
the first transmission line includes a circular portion and a portion that is integral with, and extends from, the circular portion in a direction; and
the second transmission line includes the circular portion and a portion that is integral with, and extends from, the circular portion in a different direction.

7. The antenna of claim 1 wherein:
the first transmission line includes a circular portion and a rectangular portion that is integral with, and extends from, the circular portion in a direction; and
the second transmission line includes the circular portion and a rectangular portion that is integral with, and extends from, the circular portion in a different direction.

8. The antenna of claim 1 wherein:
the first transmission line includes a circular portion and a portion that is integral with, and extends from, the circular portion in a direction, the portion having a width that increases with a distance from the circular portion; and
the second transmission line includes the circular portion and a portion that is integral with, and extends from, the circular portion in a different direction, the portion having a width that increases with a distance from the circular portion.

9. The antenna of claim 1, further comprising:
a respective first coupling region disposed between each of the first antenna elements and a respective portion of the first transmission line and configured to couple the first guided signal from the first transmission line to the first antenna element in response to the respective first control signal; and
a respective second coupling region disposed between each of the second antenna elements and a respective portion of the second transmission line and configured to couple the second guided signal from the second transmission line to the second antenna element in response to the respective second control signal.

10. The antenna of claim 1 wherein:
the characteristic includes momentum;
the first transmission line is configured to impart to the first guided signal a first momentum; and
the second transmission line is configured to impart to the second guided signal a second momentum that is different from the first momentum.

11. The antenna of claim 1 wherein:
the characteristic includes phase;
the first transmission line is configured to impart to the first guided signal a first phase; and
the second transmission line is configured to impart to the second guided signal a second phase that is different from the first phase.

12. The antenna of claim 11 wherein:
the first transmission line includes a first-signal feed point that is configured to cause the first guided signal to propagate in a direction along a first portion of the first transmission line and in another direction along a second portion of the first transmission line; and
the second waveguide includes a second-signal feed point that is configured to cause the second guided signal to propagate in a direction along a first portion of the second waveguide and in another direction along a second portion of the second waveguide.

13. The antenna of claim 1 wherein:
the characteristic includes magnitude;
the first transmission line is configured to impart to the first guided signal a first magnitude; and
the second transmission line is configured to impart to the second guided signal a second magnitude that is different from the first magnitude.

14. The antenna of claim 1 wherein:
the first transmission line includes a first-signal feed point that is configured to cause the first guided signal to have the first value of the characteristic; and
the second transmission line includes a second-signal feed point that is configured to cause the second guided signal to have the second value of the characteristic.

15. The antenna of claim 1 wherein:
the first antenna elements are arranged in a first one-dimensional array; and
the second antenna elements are arranged in a second one-dimensional array that is oriented other than parallel to the first one-dimensional array.

16. The antenna of claim 1 wherein:
the first antenna elements are arranged in a first one-dimensional array; and
the second antenna elements are arranged in a second one-dimensional array that is coplanar with, and oriented other than parallel to, the first one-dimensional array.

17. The antenna of claim 1 wherein the first transmission line is oriented other than parallel to the second transmission line.

18. The antenna of claim 1 wherein the first transmission line is coplanar with, and oriented other than parallel to, the second transmission line.

19. The antenna of claim 1 wherein:
the first transmission line includes a first-signal feed point that is configured to cause the first guided signal to propagate in a direction; and
the second transmission line includes a second-signal feed point that is configured to cause the second guided signal to propagate in another direction.

20. The antenna of claim 1 wherein:
the first transmission line is configured to cause the first guided signal to propagate in a direction; and
the second transmission line is configured to cause the second guided signal to propagate in an opposite direction.

21. The antenna of claim 1 wherein:
the first transmission line includes a feed point, and is configured to cause the first guided signal to propagate in a direction; and
the second transmission line includes the same feed point such that the second guided signal is from a same source as the first guided signal, and the second transmission line is configured to cause the second guided signal to propagate in another direction.

22. The antenna of claim 1 wherein:
the first and second transmission lines are a same transmission line;
the first and second guided signals are a same guided signal; and
the same transmission line includes an interior portion having a feed point, includes an edge, and is configured
to cause a portion of the same guided signal in response to which the first antenna elements are configured to radiate respective first transmit signals to have a momentum, and
to cause a portion of the same guided signal in response to which the second antenna elements are configured to radiate respective second transmit signals to have a different momentum.

23. The antenna of claim 1 wherein:
the first and second transmission lines are a same transmission line;
the first and second guided signals are a same guided signal; and
the same transmission line includes an edge having a feed point, includes an interior portion, and is configured
to cause a portion of the same guided signal in response to which the first antenna elements are configured to radiate respective first transmit signals to have a momentum, and
to cause a portion of the same guided signal in response to which the second antenna elements are configured to radiate respective second transmit signals to have a different momentum.

24. An antenna assembly, comprising:
an antenna, including
a first antenna section, including
a first transmission line configured to guide a first guided signal, and
first antenna elements each disposed adjacent to the first transmission line and each configured to radiate a respective first transmit signal in response to the first guided signal and in response to a respective first control signal, and
a second antenna section, including
a second transmission line configured to guide a second guided signal, and
second antenna elements each disposed adjacent to the second transmission line and each configured to radiate a respective second guided signal in response to the second guided signal and in response to a respective second control signal; and
a feeder configured
to feed the first guided signal to the first transmission line such that the first guided signal has a characteristic of a first value, and
to feed the second guided signal to the second transmission line such that the second guided signal has the characteristic of a second value that is different than the first value.

25. The antenna assembly of claim 24 wherein:
the first antenna elements are arranged in a first one-dimensional array; and
the second antenna elements are arranged in a second one-dimensional array.

26. The antenna assembly of claim 24 wherein:
the first antenna section includes first antenna units each including
a respective one of the first antenna elements disposed over a respective portion of the first transmission line, and
a respective coupling region disposed between the first antenna element and the portion of the first transmission line and configured to couple the first guided signal from the first transmission line to the antenna element in response to the respective first control signal; and
the second antenna section includes second antenna units each including
a respective one of the second antenna elements disposed over a respective portion of the second transmission line, and
a respective coupling region disposed between the second antenna element and the portion of the second transmission line and configured to couple the second guided signal from the second transmission line to the second antenna element in response to the respective second control signal.

27. The antenna assembly of claim 24 wherein:
the characteristic includes momentum;
the first guided signal has a first momentum; and
the second guided signal has a second momentum that is different than the first momentum.

28. The antenna assembly of claim 24 wherein:
the characteristic includes phase;
the first guided signal has a first phase; and
the second guided signal has a second phase that is different than the first phase.

29. The antenna assembly of claim 24 wherein:
the characteristic includes magnitude;
the first guided signal has a first magnitude; and
the second guided signal has a second magnitude that is different than the first magnitude.

30. The antenna assembly of claim 24 wherein:
the first transmission line includes an end;
the second transmission line includes an end; and
the feeder is configured
to feed a first feed signal to the first transmission line at the end of the first transmission line, and
to feed a second feed signal to the second transmission line at the end of the second transmission line.

31. The antenna assembly of claim 24 wherein:
the first transmission line includes an end;
the second transmission line includes an end; and
the feeder is configured
to feed a first feed signal to the first transmission line at the end of the first transmission line such that the first guided signal propagates in a first direction, and
to feed a second feed signal to the second transmission line at the end of the second transmission line such that the second guided signal propagates in a second direction that is different from the first direction.

32. The antenna assembly of claim 24 wherein:
the first transmission line includes an end;
the second transmission line includes an end; and
the feeder is configured
to feed a first feed signal to the first transmission line at the end of the first transmission line such that the first guided signal has the first value of the characteristic at a distance from the end of the first transmission line, and
to feed a second feed signal to the second transmission line at the end of the second transmission line such that the second guided signal has the second value of the characteristic at the distance from the end of the second transmission line.

33. The antenna assembly of claim 24 wherein:
the first transmission line includes an end;
the second transmission line includes an end; and
the feeder is configured
to feed a first feed signal to the first transmission line at a first non-zero distance from the end of the first transmission line, and
to feed a second feed signal to the second transmission line at a second non-zero distance from the end of the second transmission line.

34. The antenna assembly of claim 24 wherein:
the first transmission line includes an end;
the second transmission line includes an end; and
the feeder is configured
to feed a first feed signal to the first transmission line at the end of the first transmission line such that the first guided signal propagates in a direction, and
to feed a second feed signal to the second transmission line at the end of the second transmission line such that the second guided signal propagates in an opposite direction.

35. The antenna assembly of claim 24 wherein:
the first transmission line includes an end;
the second transmission line includes an end; and
the feeder is configured
to feed a first feed signal to the first transmission line at the end of the first transmission line such that the first guided signal propagates toward a location from a first direction, and
to feed a second feed signal to the second transmission line at the end of the second transmission line such that the second guided signal propagates toward the location from a second direction that is different from the first direction.

36. The antenna assembly of claim 24 wherein:
the first transmission line includes an end;
the second transmission line includes an end; and
the feeder is configured to feed a first feed signal to the first transmission line at the end of the first transmission line such that the first guided signal propagates away from a location in a first direction, and to feed a second feed signal to the second transmission line at the end of the second transmission line such that the second guided signal propagates away from the location in a second direction that is different than the first direction.

37. The antenna assembly of claim 24 wherein:

the first and second transmission lines are a same transmission line; and the first and second guided signals are from a same source signal.

38. The antenna assembly of claim 24 wherein the feeder includes a passive feed circuit.

39. The antenna assembly of claim 24 wherein the feeder includes an active feed circuit.

40. The antenna assembly of the claim 24 wherein:

the first transmission line includes a first waveguide; and the second transmission line includes a second waveguide.

41. An antenna system, comprising:

an antenna, including a first transmission line configured to guide a first guided signal such that the first guided signal has a characteristic of a first value, first antenna elements each disposed adjacent to the first transmission line and each configured to radiate a respective first transmit signal in response to the first guided signal and in response to a respective first control signal, a second transmission line configured to guide a second guided signal such that the second guided signal has the characteristic of a second value that is different than the first value, and second antenna elements each disposed adjacent to the second transmission line and each configured to radiate a respective second transmit signal in response to the second guided signal and in response to a respective second control signal;

a beam-steering controller configured to generate the first control signals and the second control signals;

a transmitter configured to generate a reference transmit signal; and a feeder configured to generate the first and second guided signals from the reference transmit signal, and to couple the first and second guided signals to the first and second transmission lines, respectively.

42. The antenna system of claim 41, further comprising:

wherein the first and second antenna elements are configured to generate a beam; and a receiver configured to receive, from the first and second antenna elements, a portion of the beam redirected by an object.

43. An antenna system, comprising:

an antenna, including a first antenna section, including a first transmission line configured to guide a first guided signal, and first antenna elements each disposed adjacent to the first transmission line and each configured to radiate a respective first transmit signal in response to the first guided signal and in response to a respective first control signal, and a second antenna section, including a second transmission line configured to guide a second guided signal, and second antenna elements each disposed adjacent to the second transmission line and each configured to radiate a respective second transmit signal in response to the second guided signal and in response to a respective second control signal;

a beam-steering controller configured to generate the first control signals and the second control signals;

a transmitter configured to generate a reference transmit signal; and a feeder configured to generate the first and second guided signals from the reference transmit signal, to feed the first guided signal to the first transmission line such that the first guided signal has a characteristic of a first value, and to feed the second guided signal to the second transmission line such that the second guided signal has the characteristic of a second value that is different than the first value.

44. The antenna system of claim 43, further comprising:

wherein the first and second antenna elements are configured to generate a beam; and a receiver configured to receive, from the first and second antenna elements, a portion of the beam redirected by an object.

45. A system, comprising:

an antenna, including a first transmission line configured to guide a first guided signal such that the first guided signal has a characteristic of a first value, first antenna elements each disposed adjacent to the first transmission line and each configured to radiate a respective first transmit signal in response to the first guided signal and in response to a respective first control signal to generate a beam, a second transmission line configured to guide a second guided signal such that the second guided signal has the characteristic of a second value that is different than the first value, and second antenna elements each disposed adjacent to the second transmission line and each configured to radiate the second signal in response to a respective second control signal to generate the beam;

a beam-steering controller configured to generate the first control signals and the second control signals;

a transmitter configured to generate a reference transmit signal;

a feeder configured to generate the first and second guided signals from the reference transmit signal, and to couple the first and second guided signals to the first and second transmission line, respectively;

a receiver configured to receive, from the first and second antenna elements, a portion of the beam redirected by an object; and a processing circuit configured to determine information regarding the object in response to the received portion of the beam.

46. The system of claim 45, further comprising:

a drive assembly configured to control at least one of motion and direction of a vehicle that includes the antenna; and wherein the processing circuit is configured to control the drive assembly in response to the determined information regarding the object.

47. A system, comprising:
an antenna, including
a first antenna section, including
a first transmission line configured to guide a first guided signal, and
first antenna elements each disposed adjacent to the first transmission line and each configured to radiate a respective first transmit signal in response to the first guided signal and in response to a respective first control signal to generate a beam, and
a second antenna section, including
a second transmission line configured to guide a second guided signal, and
second antenna elements each disposed adjacent to the second transmission line and each configured to radiate a respective second transmit signal in response to the second guided signal and in response to a respective second control signal to generate the beam;
a beam-steering controller configured to generate the first control signals and the second control signals;
a transmitter configured to generate a reference transmit signal;
a feeder configured
to generate the first and second guided signals from the reference transmit signal,
to feed the first guided signal to the first transmission line such that the first guided signal has a characteristic of a first value, and
to feed the second guided signal to the second transmission line such that the second guided signal has the characteristic of a second value that is different than the first value;
a receiver configured to receive, from the first and second antenna elements, a portion of the beam redirected by an object; and
a processing circuit configured to determine information regarding the object in response to the received portion of the beam.

48. The system of claim 47, further comprising:
a drive assembly configured to control at least one of motion and direction of a vehicle; and
wherein the processing circuit is configured to control the drive assembly in response to the determined information regarding the object.

49. A method, comprising:
causing a first signal to have a parameter of a first value and to propagate along a first transmission line;
causing a second signal to have the parameter of a second value and to propagate along a second transmission line; and
radiating energy from at least one of the first and second signals with at least one antenna element belonging to a group of first antenna elements disposed adjacent to the first transmission line and second antenna elements disposed adjacent to the second transmission line.

50. The method of claim 49, further comprising generating the first and second signals from a common input signal.

51. The method of claim 49 wherein:
the parameter includes phase; and
wherein causing the first signal to have the parameter of the first value and causing the second signal to have the parameter of the second value includes shifting a phase of the second signal relative to a phase of the first signal.

52. The method of claim 49 wherein:
the parameter includes momentum; and
wherein causing the first signal to have the parameter of the first value and causing the second signal to have the parameter of the second value includes causing the second signal to have a different momentum than the first signal.

53. The method of claim 49 wherein:
the parameter includes magnitude; and
wherein causing the first signal to have the parameter of the first value and causing the second signal to have the parameter of the second value includes causing the second signal to have a different magnitude than the first signal.

54. The method of claim 49 wherein:
the parameter includes direction of signal propagation; and
wherein causing the first signal to have the parameter of the first value and causing the second signal to have the parameter of the second value includes causing the second signal to propagate in a direction that is different from a direction of propagation of the first signal.

55. The method of claim 49, further comprising selectively radiating energy from the first and second signals with one or more of the first antenna elements and second antenna elements, respectively, to form and scan a beam.

56. The method of claim 55, further comprising:
receiving, from the first and second antenna elements, a portion of the beam redirected by an object; and
determining information regarding the object in response to the received portion of the beam.

57. The method of claim 56, further comprising controlling at least one of motion and direction of a vehicle in response to the determined information regarding the object.

58. A tangible, non-transitory computer-readable medium storing instructions that, when executed by computing circuitry, cause the computing circuitry, or circuitry or an apparatus coupled to the computing circuitry:
to cause a first signal to have a parameter of a first value and to propagate along a first transmission line;
to cause a second signal to have the parameter of a second value and to propagate along a second transmission line; and
to radiate energy from at least one of the first and second signals with at least one antenna element belonging to a group of first antenna elements disposed adjacent to the first transmission line and second antenna elements disposed adjacent to the second transmission line.

* * * * *